United States Patent
Schulte

(10) Patent No.: US 10,147,195 B2
(45) Date of Patent: Dec. 4, 2018

(54) OBJECT DETECTION ALONG PRE-DEFINED TRAJECTORY

(71) Applicant: FLIR Systems, Inc., Wilsonville, OR (US)

(72) Inventor: Stefan Schulte, Marke (BE)

(73) Assignee: FLIR SYSTEMS, INC., Wilsonville, OR (US)

( * ) Notice: Subject to any disclaimer, the term of this patent is extended or adjusted under 35 U.S.C. 154(b) by 9 days.

(21) Appl. No.: 15/429,028

(22) Filed: Feb. 9, 2017

(65) Prior Publication Data

US 2017/0243360 A1   Aug. 24, 2017

Related U.S. Application Data

(60) Provisional application No. 62/297,419, filed on Feb. 19, 2016.

(51) Int. Cl.
 *G06K 9/00* (2006.01)
 *G06T 7/246* (2017.01)
 (Continued)

(52) U.S. Cl.
 CPC ............ *G06T 7/246* (2017.01); *B61L 23/041* (2013.01); *G06K 9/00771* (2013.01); *G06K 9/3241* (2013.01); *G06K 9/6212* (2013.01); *G06T 7/11* (2017.01); *G06T 7/73* (2017.01); *G06T 2207/10004* (2013.01); *G06T 2207/30241* (2013.01); *G06T 2207/30252* (2013.01)

(58) Field of Classification Search
 CPC ... G06T 7/11; G06T 7/246; G06T 7/73; G06T 2207/10004; G06T 2207/30241; G06T 2207/30252; B61L 23/041; G06K 9/00771; G06K 9/3241; G06K 9/6212

USPC .......................................................... 382/103
See application file for complete search history.

(56) References Cited

U.S. PATENT DOCUMENTS 5,960,111 A    9/1999  Chen et al.
6,658,136 B1   12/2003 Brumitt
               (Continued)

FOREIGN PATENT DOCUMENTS

EP         2 093 699        8/2009
WO    WO 2008/046662        4/2008

OTHER PUBLICATIONS

Karasulu etal., 'Chapter 2 Moving Object Detection and Tracking in Videos', 2013, Performance Evaluation Software, SpringerBriefs 7 in Computer Science, p. 7-30.*

(Continued)

*Primary Examiner* — Gregory F Cunningham
(74) *Attorney, Agent, or Firm* — Haynes and Boone, LLP

(57) ABSTRACT

Systems and methods according to one or more embodiments are provided for detecting an object in a field of view of an imaging device. An object may be detected by an imaging device when the object is present along a trajectory in a target scene. In one example, a system includes a memory component to store a plurality of images of the target scene and a processor. The processor is configured to define the trajectory between two locations within the target scene and extract a subset of pixel values from each of successive images corresponding to the trajectory. The extracted subsets of pixel values are processed to detect an object within the target scene. Additional systems and methods are also provided.

18 Claims, 16 Drawing Sheets

(51) Int. Cl.
G06T 7/11 (2017.01)
G06T 7/73 (2017.01)
B61L 23/04 (2006.01)
G06K 9/32 (2006.01)
G06K 9/62 (2006.01)

(56) References Cited

U.S. PATENT DOCUMENTS

| | | |
|---|---|---|
| 6,909,806 B2 | 6/2005 | Li |
| 6,912,313 B2 | 6/2005 | Li |
| 7,916,944 B2 | 3/2011 | Yang et al. |
| 7,995,859 B2 | 8/2011 | Högasten |
| 8,159,536 B2 | 4/2012 | Wang et al. |
| 8,208,755 B1 | 6/2012 | Högasten |
| 8,265,349 B2 | 9/2012 | Wang et al. |
| 2012/0269383 A1 | 10/2012 | Bobbitt et al. |
| 2014/0056479 A1 | 2/2014 | Bobbitt et al. |
| 2015/0187102 A1 | 7/2015 | Park et al. |

OTHER PUBLICATIONS

Dogan et al., Real Time Speed Estimation of Moving Vehicles from Side View Images from an Uncalibrated Video Camera Dec. 2010, Sensors, p. 4806-4824.*
Anil Rao Y G et al., "Real-Time Speed Estimation of Vehicles from Uncalibrated View-Independent Traffic Cameras", IEEE, 2015.*

* cited by examiner

OBJECT DETECTION ALONG PRE-DEFINED TRAJECTORY

CROSS-REFERENCE TO RELATED APPLICATIONS

This application claims the benefit of and priority to U.S. Provisional Patent Application No. 62/297,419 filed Feb. 19, 2016 and entitled "OBJECT DETECTION ALONG PRE-DEFINED TRAJECTORY," which is incorporated herein by reference in its entirety.

TECHNICAL FIELD

The present invention relates generally to image processing and, more particularly, for example, to improvements in processing images to detect objects in pre-defined locations.

BACKGROUND

In the field of image processing, there is an ongoing effort to provide an efficient and reliable way to detect an object of interest within a field of view (e.g., a scene) of an imaging device. However, such techniques rely on cumbersome processing intensive routines to detect the presence of an object of interest in a scene.

For example, general subtraction methods may be used to obtain a foreground of a scene that can be analyzed to determine if an object is present and, if so, further analyzed to determine an identification of the object detected. Several issues arising from conventional techniques such as image occlusion and defragmentation may make object detection unreliable. Moreover, these techniques may not be suited for real time processing applications due to the excessive amount of image data available to process. Thus, there is a need for object detection solutions that may provide performance or other advantages over conventional object detection systems.

SUMMARY

Systems and methods are disclosed herein in accordance with one or more embodiments that provide an improved approach to detecting an object of interest within the field of view of an imaging device.

In one embodiment, a method includes defining a trajectory comprising a path between two locations within a target scene; receiving a plurality of images of the target scene; extracting, from each of the images, a subset of pixel values corresponding to the trajectory; and processing the extracted pixel values to detect an object in the target scene.

In another embodiment, a system includes a memory component configured to store a plurality of images of a target scene; and a processor configured to: define a trajectory between two locations within the target scene, extract, from each of the images, a subset of pixel values corresponding to the trajectory, and process the extracted pixel values to detect an object in the target scene.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Techniques are provided to detect objects of interest (e.g., a train, a tram, a metro, and/or other types of vehicles, humans, and/or animals) that are moving in a pre-defined trajectory within a target scene (e.g., field of view of an imaging device). The pre-defined trajectory may be a path between two locations within the target scene, such as a rail or a roadway. A fixed image of the target scene may be captured at various times. A subset of pixel values corresponding to the trajectory may be extracted from each of the captured images and the subsets of pixel values may be compared to determine changes among the images. An object may be detected within the trajectory using the determined changes. In some embodiments, the images are thermal images and an object may be detected when the determined changes correspond to a change in thermal radiation. In some embodiments, a speed of a moving object may be detected using the determined changes.

In some embodiments, upon the preliminary detection of an object along a trajectory, further video analytics processing may be performed on portions of the captured images greater than the trajectory subset of pixels to detect an additional object in the target scene. In addition, the system may generate an alert in response to a detection of the additional object.

In various embodiments, the processing techniques described herein may be advantageously used to detect objects efficiently and with reductions in processing overhead associated with conventional object detection approaches. For example, in various embodiments disclosed herein, a target scene background is not required to be learned and a complex classification system of objects is not required to be generated to detect an object along a pre-defined trajectory. As a result, occlusion and defragmentation issues typically associated with conventional background and classification processes are reduced. By reducing the number of pixels undergoing analysis, object detection may be performed rapidly, for example, substantially in real time as images of a target scene are captured.

Figure 1:
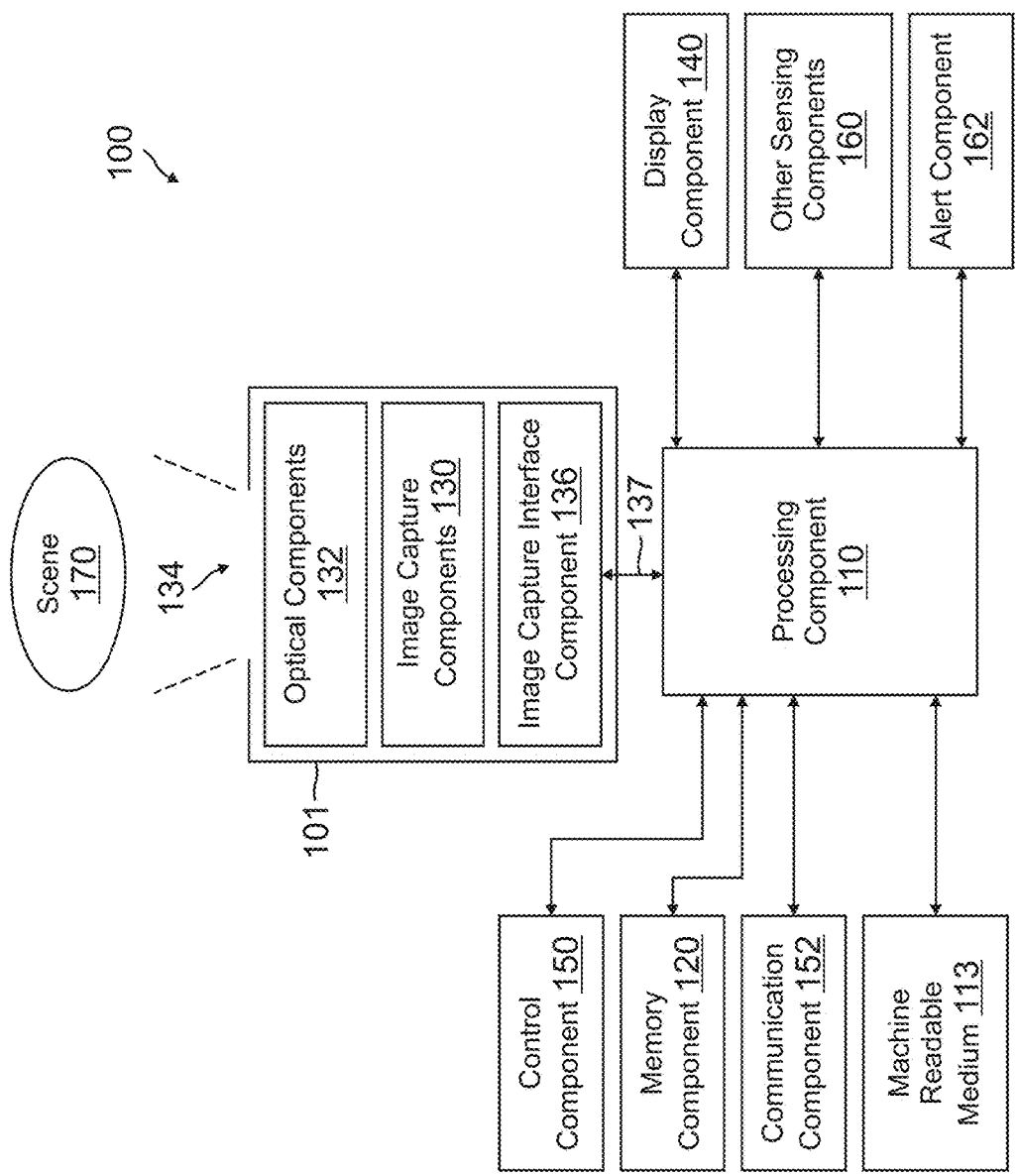
FIG. 1 illustrates a block diagram of an imaging system in accordance with an embodiment of the disclosure.

FIG. 1 illustrates a block diagram of an imaging system 100 in accordance with an embodiment of the disclosure. Imaging system 100 may be used to capture and process image frames in accordance with various techniques described herein. In one embodiment, various components of imaging system 100 may be provided in a camera component 101, such as an imaging camera. In another embodiment, one or more components of imaging system 100 may be implemented remotely from each other in a distributed fashion (e.g., networked or otherwise).

In one embodiment, imaging system 100 includes a processing component 110, a memory component 120, an image capture component 130, optical components 132 (e.g., one or more lenses configured to receive electromagnetic radiation through an aperture 134 in camera component 101 and pass the electromagnetic radiation to image capture component 130), an image capture interface component 136, a display component 140, a control component 150, a communication component 152, other sensing components 160, and an alert component 162.

In various embodiments, imaging system 100 may be implemented as an imaging device, such as camera component 101, to capture image frames, for example, of a scene 170 (e.g., a field of view). In some embodiments, camera component 101 may include image capture component 130, optical components 132, and image capture interface component 136 housed in a protective enclosure. Imaging system 100 may represent any type of camera system which, for example, detects electromagnetic radiation (e.g., irradiance) and provides representative data (e.g., one or more still image frames or video image frames). For example, imaging system 100 may represent a camera component 101 that is directed to detect visible light and/or infrared radiation and provide associated image data.

Imaging system 100 may include a portable device and may be implemented, for example, as a handheld device and/or coupled, in other examples, to various types of vehicles (e.g., a land-based vehicle, a watercraft, an aircraft, a spacecraft, or other vehicle). Imaging system 100 may be implemented with camera component 101 at various types of fixed locations (e.g., train station platform, metro platform, car parking lot, or other locations) via one or more types of structural mounts. In some embodiments, camera component 101 may be mounted in a stationary arrangement to capture repetitive images of a target scene 170.

Processing component 110 may include, for example, a microprocessor, a single-core processor, a multi-core processor, a microcontroller, a logic device (e.g., a programmable logic device configured to perform processing operations), a digital signal processing (DSP) device, one or more memories for storing executable instructions (e.g., software, firmware, or other instructions), and/or any other appropriate combination of processing device and/or memory to execute instructions to perform any of the various operations described herein. Processing component 110 is adapted to interface and communicate with components 120, 130, 140, 150, 160, and 162 to perform method and processing steps as described herein. In various embodiments, it should be appreciated that processing operations and/or instructions may be integrated in software and/or hardware as part of processing component 110, or code (e.g., software or configuration data) which may be stored in memory component 120. Embodiments of processing operations and/or instructions disclosed herein may be stored by a machine readable medium 113 in a non-transitory manner (e.g., a memory, a hard drive, a compact disk, a digital video disk, or a flash memory) to be executed by a computer (e.g., logic or processor-based system) to perform various methods disclosed herein.

In various embodiments, the machine readable medium 113 may be included as part of imaging system 100 and/or separate from imaging system 100, with stored instructions provided to imaging system 100 by coupling the machine readable medium 113 to imaging system 100 and/or by imaging system 100 downloading (e.g., via a wired or wireless link) the instructions from the machine readable medium (e.g., containing the non-transitory information). In various embodiments, as described herein, instructions provide for real time applications of processing various image frames of scene 170.

Memory component 120 includes, in one embodiment, one or more memory devices (e.g., one or more memories) to store data and information. The one or more memory devices may include various types of memory including volatile and non-volatile memory devices, such as RAM (Random Access Memory), ROM (Read-Only Memory), EEPROM (Electrically-Erasable Read-Only Memory), flash memory, or other types of memory. In one embodiment, processing component 110 is adapted to execute software stored in memory component 120 and/or machine-readable medium 113 to perform various methods, processes, and operations in a manner as described herein.

Image capture component 130 includes, in one embodiment, one or more sensors (e.g., any type visible light, infrared, or other type of detector) for capturing image signals representative of an image, of scene 170. In one embodiment, the sensors of image capture component 130 provide for representing (e.g., converting) a captured thermal image signal of scene 170 as digital data (e.g., via an analog-to-digital converter included as part of the sensor or separate from the sensor as part of imaging system 100).

Processing component 110 may be adapted to receive image signals from image capture component 130, process image signals (e.g., to provide processed image data), store image signals or image data in memory component 120, and/or retrieve stored image signals from memory component 120. In various aspects, processing component 110 may be remotely positioned, and processing component 110 may be adapted to remotely receive image signals from image capture component 130 via wired or wireless communication with image capture interface component 136, as described herein. Processing component 110 may be adapted to process image signals stored in memory component 120 to provide image data (e.g., captured and/or processed image data) to display component 140 for viewing by a user.

Display component 140 includes, in one embodiment, an image display device (e.g., a liquid crystal display (LCD)) or various other types of generally known video displays or monitors. Processing component 110 may be adapted to display image data and information on display component 140. Processing component 110 may be adapted to retrieve image data and information from memory component 120 and display any retrieved image data and information on display component 140. Display component 140 may include display electronics, which may be utilized by processing component 110 to display image data and information. Display component 140 may receive image data and information directly from image capture component 130 via processing component 110, or the image data and information may be transferred from memory component 120 via processing component 110.

Control component 150 includes, in one embodiment, a user input and/or interface device having one or more user actuated components, such as one or more push buttons, slide bars, rotatable knobs or a keyboard, that are adapted to generate one or more user actuated input control signals. Control component 150 may be adapted to be integrated as part of display component 140 to operate as both a user input device and a display device, such as, for example, a touch screen device adapted to receive input signals from a user touching different parts of the display screen. Processing component 110 may be adapted to sense control input signals from control component 150 and respond to any sensed control input signals received therefrom.

Control component 150 may include, in one embodiment, a control panel unit (e.g., a wired or wireless handheld control unit) having one or more user-activated mechanisms (e.g., buttons, knobs, sliders, or others) adapted to interface with a user and receive user input control signals. In various embodiments, it should be appreciated that the control panel unit may be adapted to include one or more other user-activated mechanisms to provide various other control operations of imaging system 100, such as auto-focus, menu enable and selection, field of view (FoV), brightness, contrast, gain, offset, spatial, temporal, and/or various other features and/or parameters.

In another embodiment, control component 150 may include a graphical user interface (GUI), which may be integrated as part of display component 140 (e.g., a user actuated touch screen), having one or more images of the user-activated mechanisms (e.g., buttons, knobs, sliders, or others), which are adapted to interface with a user and receive user input control signals via the display component 140. As an example for one or more embodiments as discussed further herein, display component 140 and control component 150 may represent appropriate portions of a tablet, a laptop computer, a desktop computer, or other type of device.

Processing component 110 may be adapted to communicate with image capture interface component 136 (e.g., by receiving data and information from image capture component 130). Image capture interface component 136 may be configured to receive image signals (e.g., image frames) from image capture component 130 and communicate image signals to processing component 110 directly or through one or more wired or wireless communication components (e.g., represented by connection 137) in the manner of communication component 152 further described herein. Camera 101 and processing component 110 may be positioned proximate to or remote from each other in various embodiments.

In another embodiment, imaging system 100 may include one or more other types of sensing components 160, including environmental and/or operational sensors, depending on the sensed application or implementation, which provide information to processing component 110 (e.g., by receiving sensor information from each sensing component 160). In various embodiments, other sensing components 160 may be adapted to provide data and information related to environmental conditions, such as internal and/or external temperature conditions, lighting conditions (e.g., day, night, dusk, and/or dawn), humidity levels, specific weather conditions (e.g., sun, rain, and/or snow), distance (e.g., laser rangefinder), and/or whether a tunnel, a covered parking garage, or that some type of enclosure has been entered or exited. Accordingly, other sensing components 160 may include one or more conventional sensors as would be known by those skilled in the art for monitoring various conditions (e.g., environmental conditions) that may have an effect (e.g., on the image appearance) on the data provided by image capture component 130.

In some embodiments, other sensing components 160 may include devices that relay information to processing component 110 via wireless communication. For example, each sensing component 160 may be adapted to receive information from a satellite, through a local broadcast (e.g., radio frequency) transmission, through a mobile or cellular network and/or through information beacons in an infrastructure (e.g., a transportation or highway information beacon infrastructure) or various other wired or wireless techniques.

Imaging system 100 may include an alert component 162 adapted to interface with processing component 110 (e.g., via wired or wireless communication) and provide a notification in response to input received from processing component 110. Notification may be communicated in various formats. For example, in one embodiment, an audible signal (e.g., audible alarm) may provide notification to a user and/or persons within range of the audible signal. In another embodiment, a visible signal (e.g., flashing light) may provide notification to a user and/or persons within sight of the visible signal. An electronic message (e.g., electronic message received by a smart phone, a tablet, a personal digital assistant (e.g., a wireless, mobile device), a laptop computer, a desktop computer, or other type of device) may be communicated in response to an input received from processing component 110.

In one embodiment, communication component 152 may be implemented as a network interface component (NIC) adapted for communication with a network including other devices in the network. In various embodiments, communication component 152 may include one or more wired or wireless communication components, such as an Ethernet connection, a wireless local area network (WLAN) component based on the IEEE 802.11 standards, a wireless broadband component, mobile cellular component, a wireless satellite component, or various other types of wireless communication components including radio frequency (RF), microwave frequency (MWF), and/or infrared frequency (IRF) components adapted for communication with a network. As such, communication component 152 may include an antenna coupled thereto for wireless communication purposes. In other embodiments, the communication component 152 may be adapted to interface with a DSL (e.g., Digital Subscriber Line) modem, a PSTN (Public Switched Telephone Network) modem, an Ethernet device, and/or various other types of wired and/or wireless network communication devices adapted for communication with a network.

In various embodiments, a network may be implemented as a single network or a combination of multiple networks. For example, in various embodiments, the network may include the Internet and/or one or more intranets, landline networks, wireless networks, and/or other appropriate types of communication networks. In another example, the network may include a wireless telecommunications network (e.g., cellular phone network) adapted to communicate with other communication networks, such as the Internet. As such, in various embodiments, imaging system 100 and/or its individual associated components may be associated with a particular network link such as for example a URL (Uniform Resource Locator), an IP (Internet Protocol) address, and/or a mobile phone number.

In various embodiments, imaging system 100 provides a capability, in substantially real time, to detect an object in target scene 170. For example, imaging system 100 may be configured to capture two or more images of target scene 170 using camera 101 (e.g., a thermal imaging camera). Captured images may be received by processing component 110 and stored in memory component 120. Processing component may be configured to define a trajectory (e.g., such as trajectory 205 of FIG. 2) between two locations within target scene 170. Processing component 110 may extract from each of the captured images, a subset of pixel values of target scene 170 corresponding to trajectory 205. Processing component 110 may process the extracted pixel values to detect an object in target scene 170 by comparing two or more image frames of extracted subsets of pixel values and determining changes in the subsets of pixel values among the two or more images. In addition, processing component 110 may determine a location and a direction of travel of the detected object.

Figure 2:
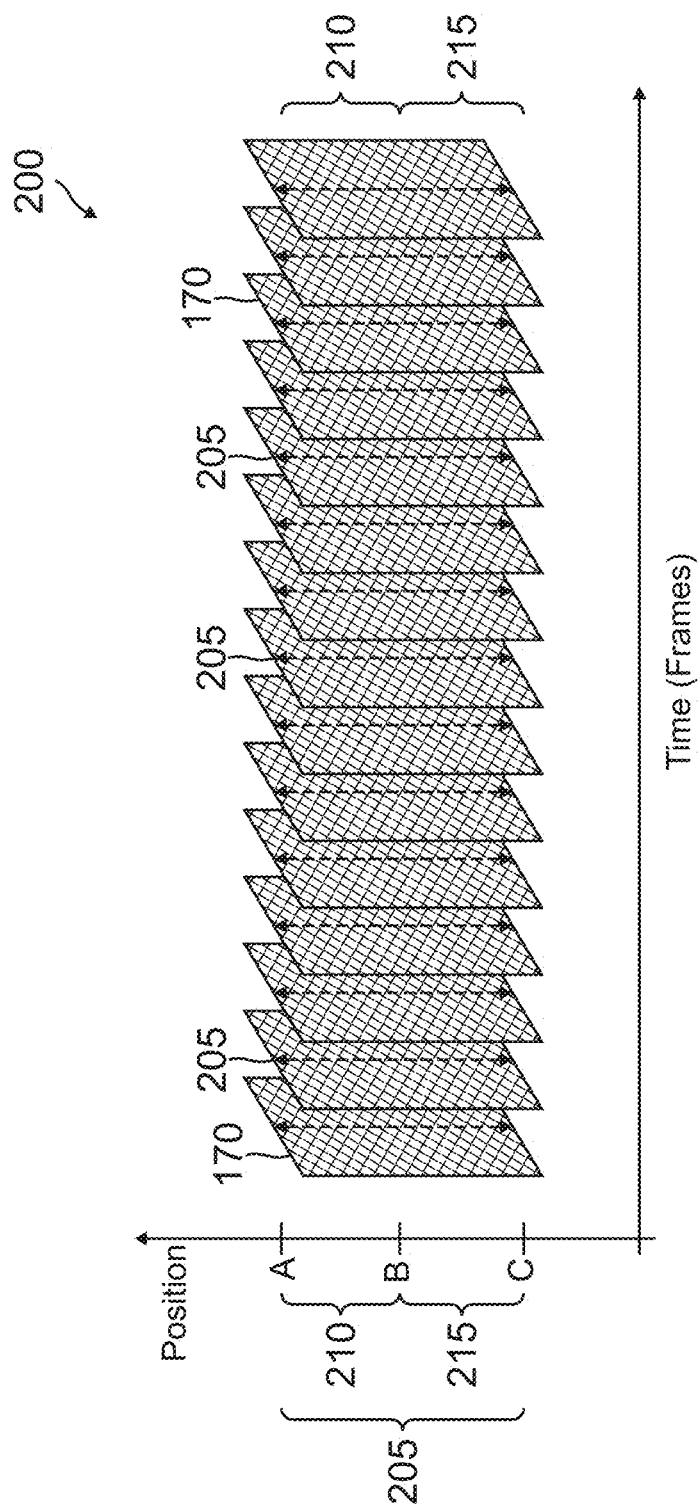
FIG. 2 illustrates image frames captured of a target scene including a trajectory in accordance with an embodiment of the disclosure.

FIG. 2 illustrates image frames 200 captured of a target scene 170 including a trajectory 205 successively captured in time in accordance with an embodiment of the disclosure. An image frame of target scene 170 may include a plurality of pixels arranged in columns and rows. As shown in FIG. 2, each target scene 170 image frame may include a trajectory 205. Trajectory 205 may be configured as a pre-defined path between two locations (e.g., between positions A and C of FIG. 2) within a broader target scene 170. In some embodiments, trajectory 205 may be a set of rails used by commuter trains or other types of trains within a railway station target scene. In other embodiments, trajectory 205 may be a roadway used by a metro or other motor vehicles within a metro station target scene. In yet another embodiment, trajectory 205 may a parking space within an auto parking lot target scene.

Generally, trajectory 205 may be configured as a pre-defined fixed path within a broader target scene 170. In this regard, trajectory 205 may form a subset of the total number of pixels of target scene 170. Furthermore, a fixed column and row subset of pixels (e.g., trajectory 205) may be extracted for each successive captured image frame. Image frames of target scene 170 including trajectory 205 may be continuously captured in periodic time intervals and trajectory 205 subset of pixels may be extracted from each captured image frame and processed for object detection as further described herein.

Trajectory 205 may include one or more segments, such as segment 210 (e.g., corresponding to a path between positions A and B of FIG. 2) and segment 215 (e.g., corresponding to a path between positions B and C of FIG. 2). In some embodiments, trajectory 205 may include only a single segment or additional segments.

FIGS. 3A-3E illustrate a target scene 170 and an object 331 moving through a pre-defined trajectory 205 within the target scene 170 at various times in accordance with embodiments of the disclosure. As shown, FIGS. 3A-3E illustrate various example scenes (e.g., scenes 300, 301, 302, 303, and 304) of corresponding target scene 170 as captured by camera 101. Camera 101 may be arranged in a fixed orientation to capture images of target scene 170 including trajectory 205 at various times as illustrated by example scenes 300 through 304. Trajectory 205 is a path extending past either end of platform 325 along a set of rail tracks 327. Trajectory 205 includes a segment 210 (e.g., corresponding to a path between positions A and B) and a segment 215 (e.g., corresponding to a path between positions B and C). Example scenes show a train 331 entering target scene 170, picking up persons 329 at a train station platform 325, and exiting target scene 170.

Figure 3A:
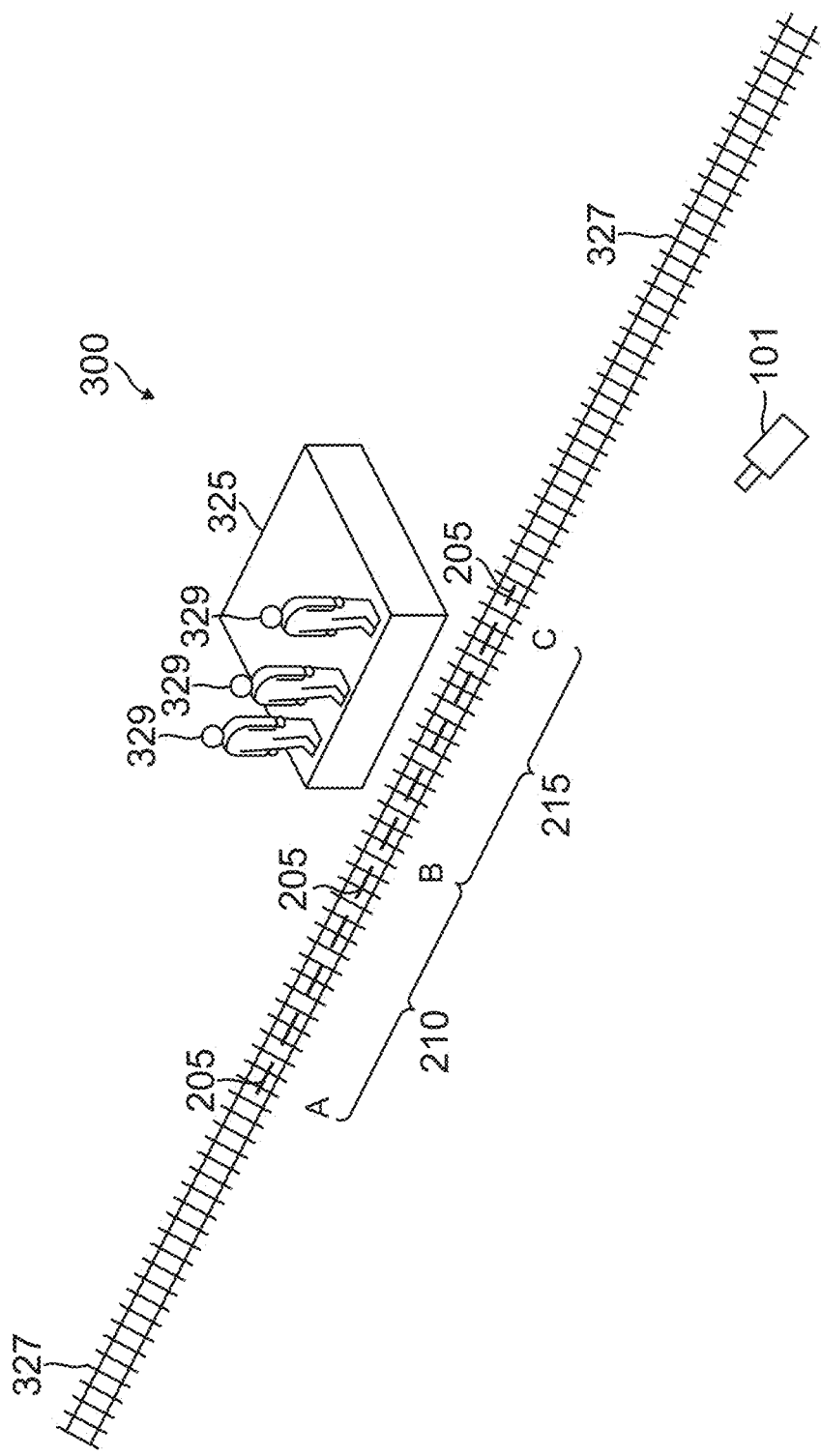
FIGS. 3A-3E illustrate a target scene and an object moving through a pre-defined trajectory within the target scene at various times in accordance with embodiments of the disclosure.

FIG. 3A illustrates a scene 300 with train station platform 325 and several persons 329 standing on platform 325. As shown, scene 300 is substantially stationary without an object along on trajectory 205, corresponding to a pre-arrival of train 331 (e.g., such as train 331 of FIG. 3B).

Figure 3B:
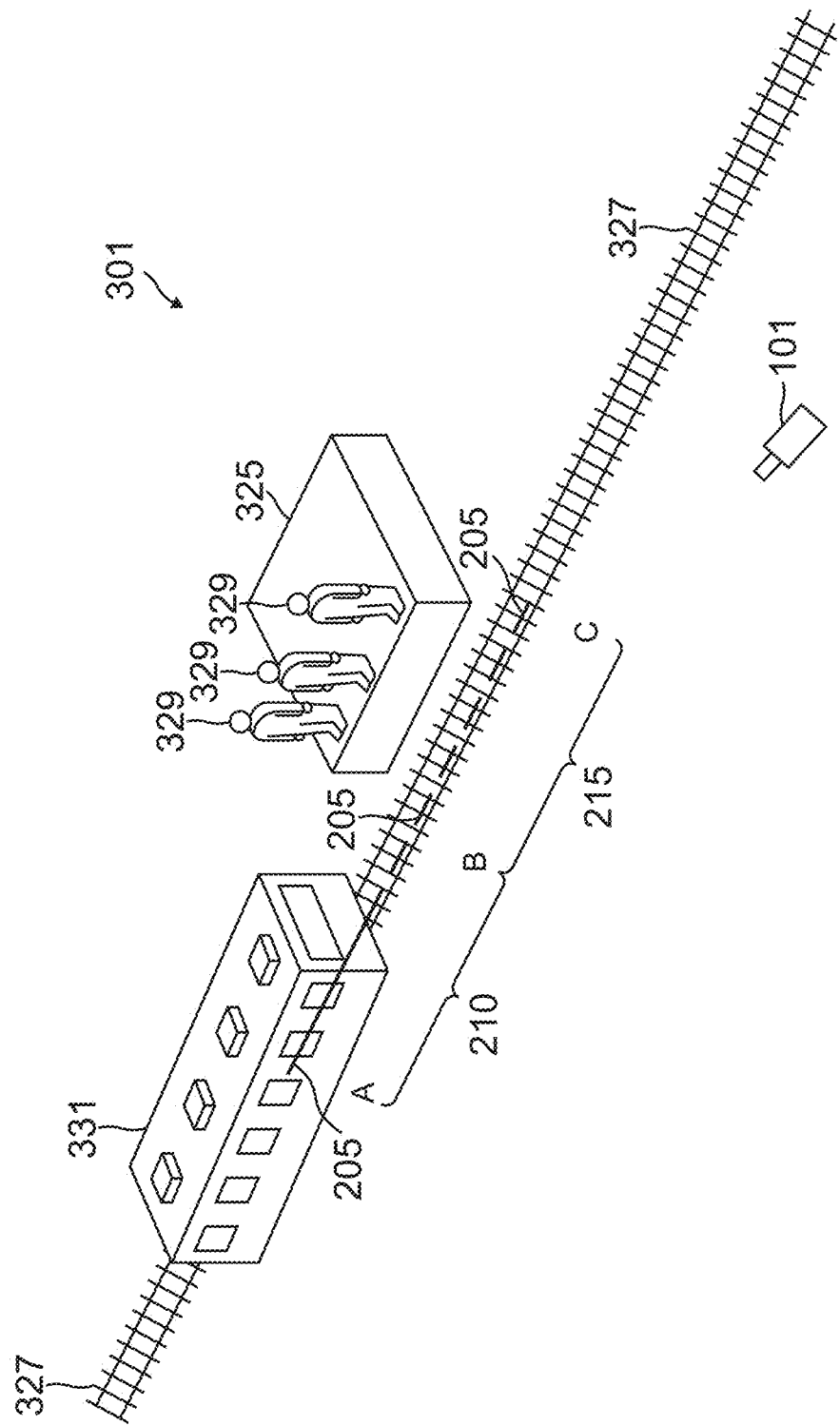

FIG. 3B illustrates a scene 301 with train 331 approaching platform 325 on trajectory 205. Captured images of scene 301 may show trajectory 205 with train detected on segment 210 and a substantially stationary scene without an object along on segment 215.

Figure 3C:
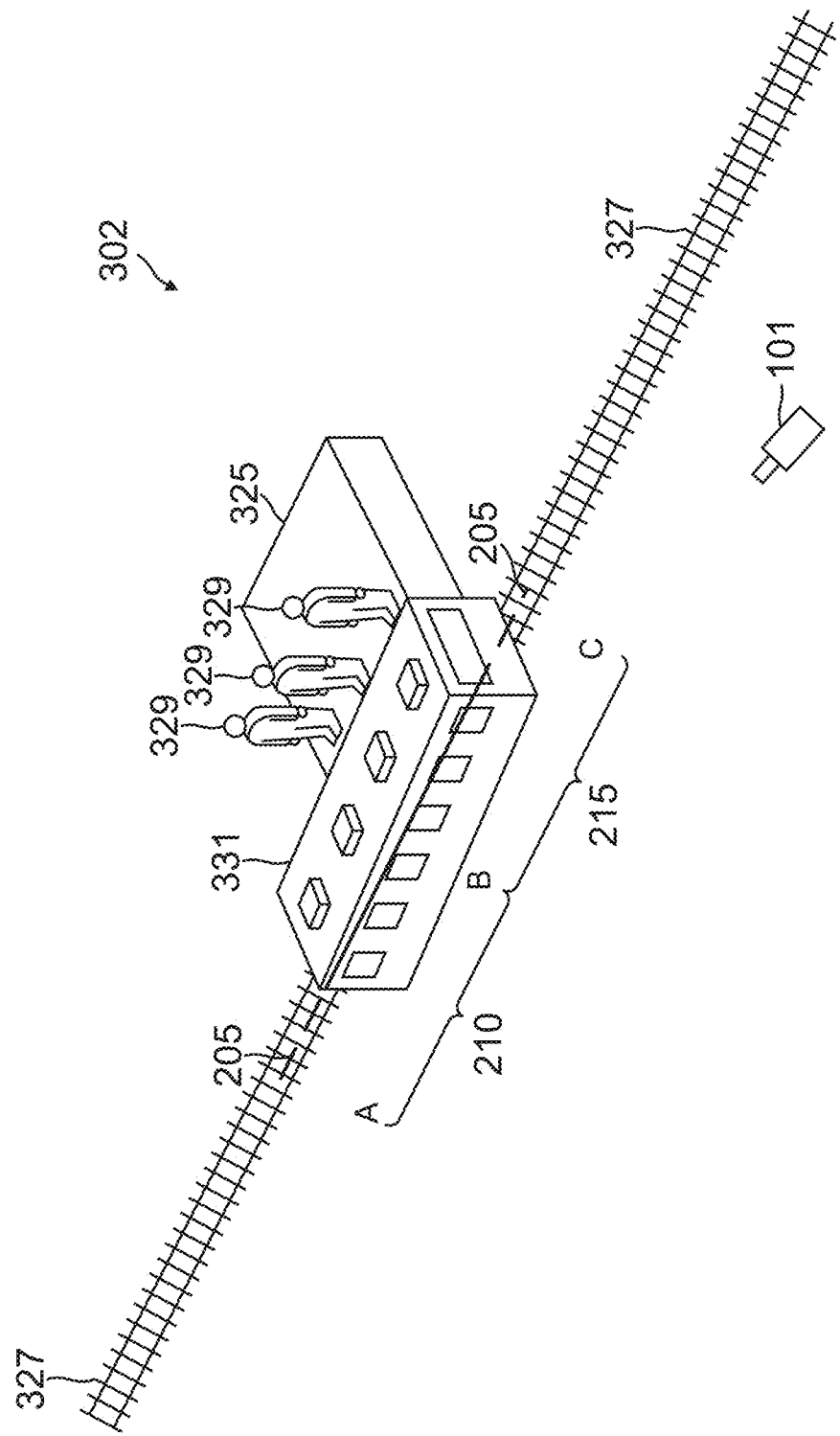

FIG. 3C illustrates a scene 302 with train 331 stopped at platform 325. Captured images of scene 302 may show trajectory 205 with train 331 on rail tracks 327 stopped at platform 325 in segments 210 and 215. Persons 329 may be embarking and disembarking train 331 in scene 302.

Figure 3D:
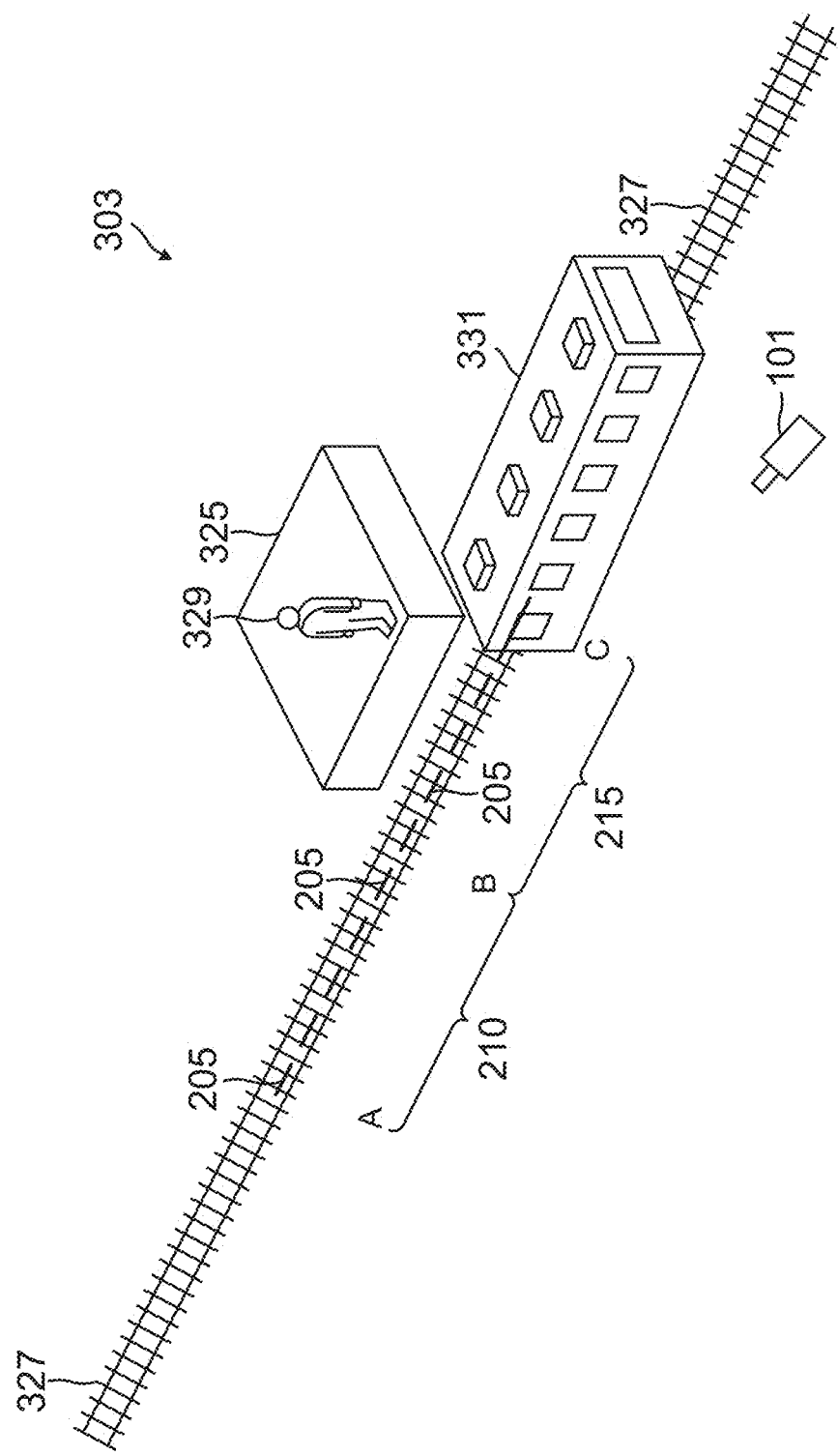

FIG. 3D illustrates a scene 303 with train 331 leaving platform 325. Captured images of scene 303 may show trajectory 205 with train 331 on rail tracks 327 leaving platform 325 in segment 215 and may show a substantially stationary scene in segment 210.

Figure 3E:
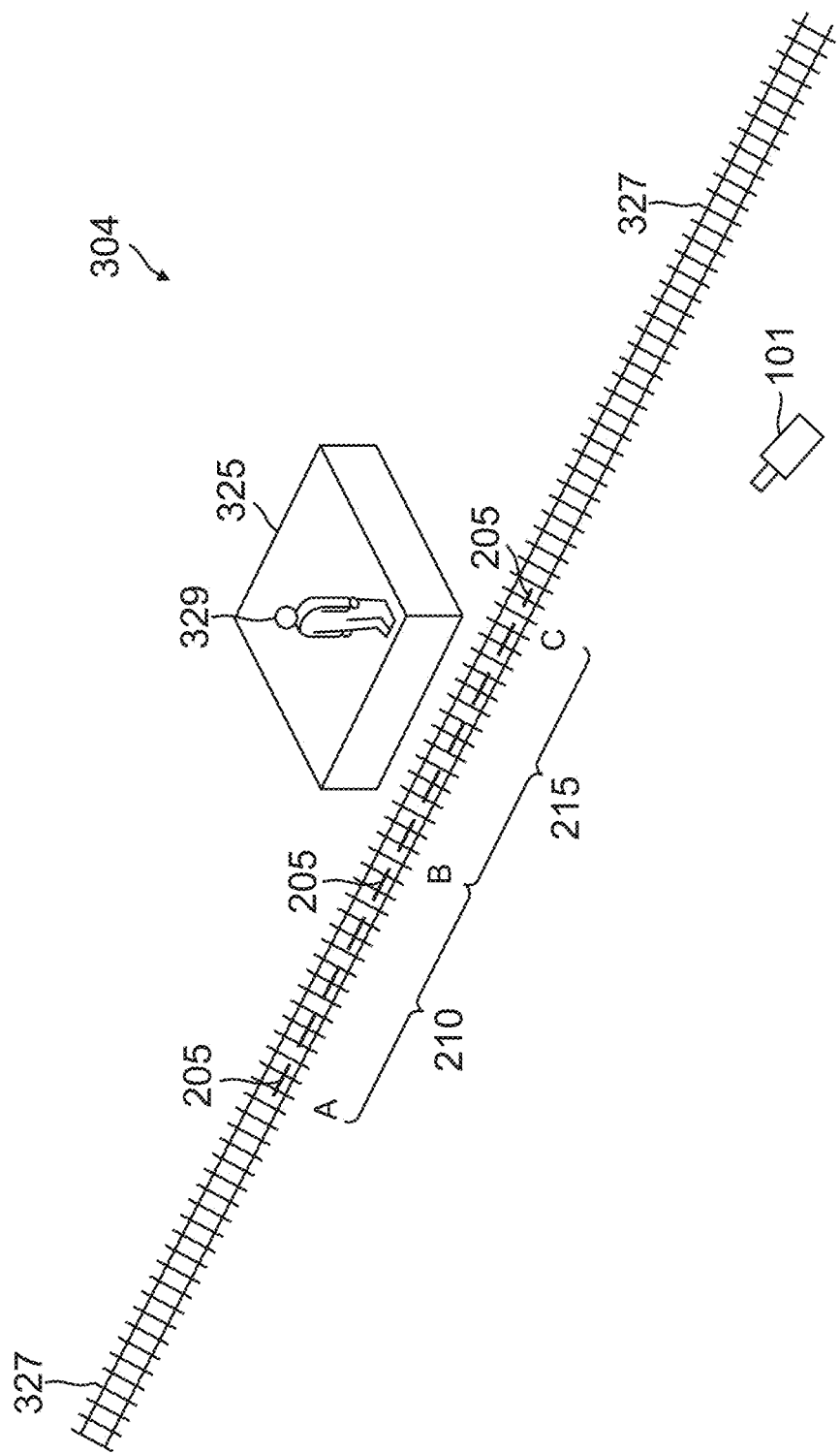

FIG. 3E illustrates a scene 304 with a train station platform 325 and one person 329 standing on platform 325 after train 331 had exited target scene 170. As shown, scene 304 is substantially stationary without an object along on trajectory 205, corresponding to a post-departure of train 331.

Figure 4:
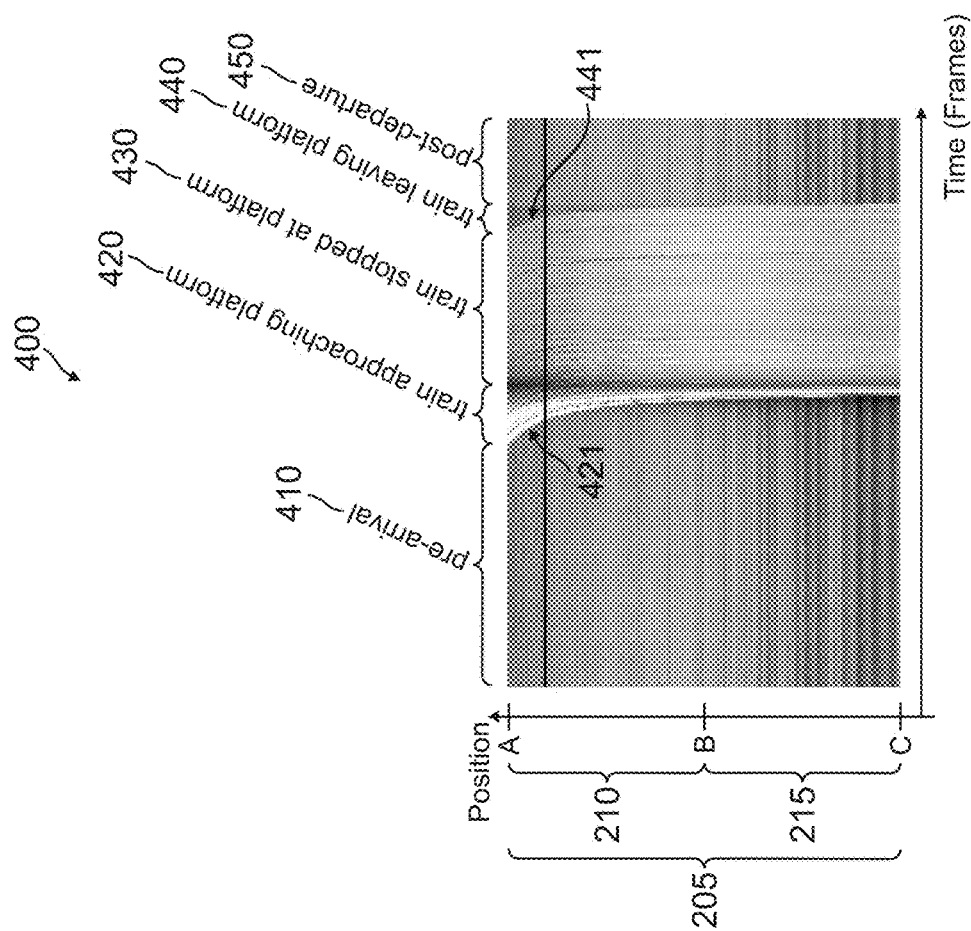
FIGS. 4 and 5 illustrate plots of a plurality of extracted subsets of pixels corresponding to the trajectory of the target scene of FIGS. 3A-3E in accordance with embodiments of the disclosure.
Figure 5:
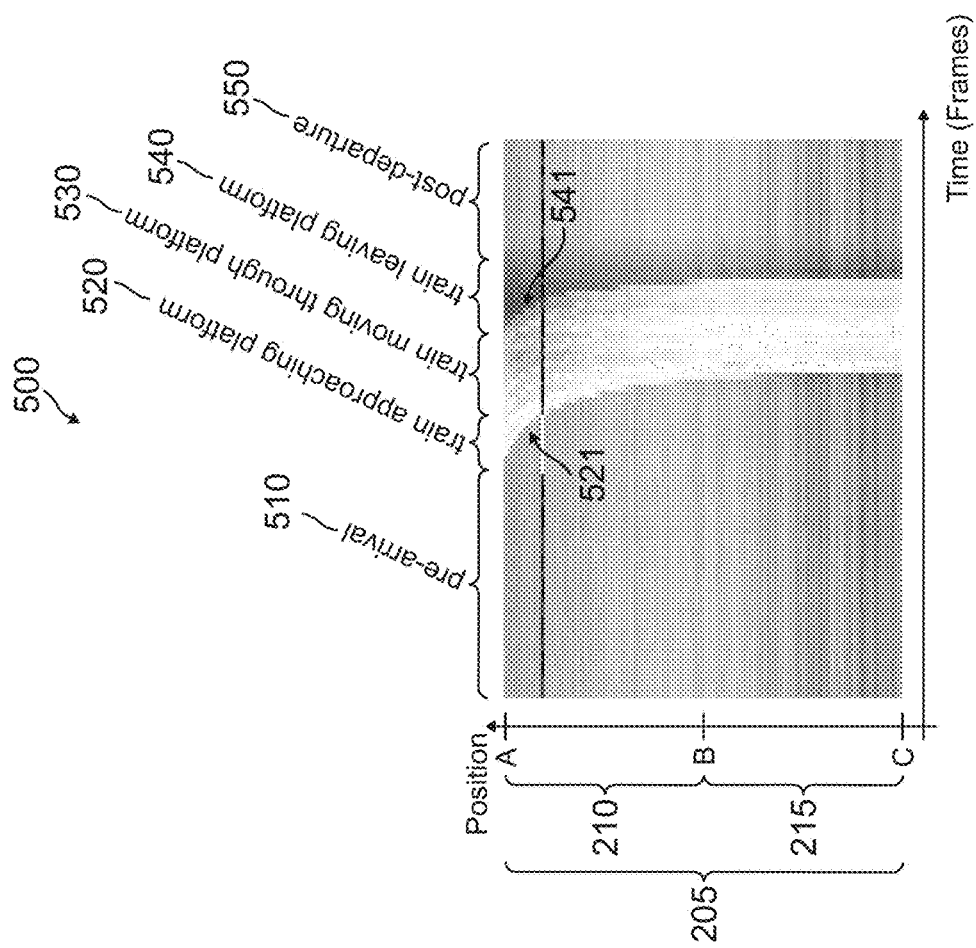

FIGS. 4 and 5 illustrate plots of a plurality of extracted subsets of pixels corresponding to the trajectory 205 of the target scene 170 of FIGS. 3A-3E in accordance with embodiments of the disclosure. FIG. 4 shows a plot 400 of a plurality of extracted subsets of pixels corresponding to trajectory 205 of target scene 170. In this regard, periods on plot 400 correspond to scenes of FIGS. 3A through 3E. For example, image frames of extracted pixels of trajectory 205 in pre-arrival period 410 on plot 400 corresponds to FIG. 3A where train 331 has not entered target scene 170. Image frames of extracted pixels of trajectory 205 in train approaching platform period 420 corresponds to FIG. 3B where train 331 is approaching train platform 325 along trajectory 205. Image frames of extracted pixels of trajectory 205 in train stopped at platform period 430 corresponds to FIG. 3C where train 331 is stopped at platform 325 along trajectory 205 and persons 329 are embarking and disembarking. Image frames of extracted pixels of trajectory 205 in train leaving platform period 440 corresponds to FIG. 3D where train 331 is leaving platform 325 along trajectory 205. Image frames of trajectory 205 in post-departure period 450 corresponds to FIG. 3E where a single person is standing on platform 325 after train 331 moved out of target scene 170.

Imaging system 100 may capture successive periodic images of target scene 170 using camera 101 (e.g., a thermal camera) to capture train 331 as it moves through target scene 170 along trajectory 205. Processing component 110 may extract, from each of the images, a subset of pixel values corresponding to trajectory 205 and store the subset of pixel values in memory component 120 or generate a plot (e.g., plot 400) of the plurality of extracted subsets of pixel values. Plot 400 includes a position axis with positions A through C corresponding to trajectory 205. Trajectory 205 may include segments with positions A to B, and B to C, corresponding to segments 210 and 215, respectively. The plurality of captured image frames are time sequenced along a time (frames) axis.

Plot 400 includes a plurality of extracted subsets of pixels along trajectory 205 showing a pre-arrival period 410 corresponding to FIG. 3A. Pre-arrival period 410 shows constant pixel values in extracted subsets of pixels from image frame to image frame corresponding to a scene without an object detected on trajectory 205. A train approaching platform period 420 may include a plurality of extracted subsets of pixels of images where train 331 is in target scene 170 on trajectory 205 and moving into segment 210 corresponding to FIG. 3B. Train approaching platform period 420 of plot 400 may show a change from image frame to image frame of thermal radiation observed by a change in brightness (e.g., intensity) of the pixel value. Processing component 110 may compare the extracted subsets of pixel values from the plurality of images of target scene 170. Plot 400 may show train 331 entering target scene 170 where determined changes in pixel values among the plurality of images of train approaching period 420 correspond to an increase in thermal radiation. In addition, processor may determine train 331 may be within segment 210, as indicated by an increase in thermal radiation for pixel values within segment 210.

Plot 400 includes a plurality of extracted subsets of pixels of images showing a train stopped at platform period 430. Train stopped at platform period 430 corresponds to target scene 170 of FIG. 3C. Processing component 110 may compare the extracted subsets of pixel values from the plurality of images of train stopped at platform period 430 and determined changes may correspond to a substantially constant and increased thermal radiation (e.g., increased thermal radiation compared to pre-arrival period 410) indicating train 331 may be stopped at platform 325. Processing component 110 may determine train 331 may be stopped within segments 210 and 215 by comparing the extracted subsets of pixel values within each of segments 210 and 215.

Plot 400 includes a plurality of extracted subsets of pixels of images showing a train leaving platform period 440. Train leaving platform period 440 corresponds to target scene 170 of FIG. 3D. Processing component 110 may compare the extracted subsets of pixel values from the plurality of images of train leaving platform period 440 and determined changes correspond to a decrease in thermal radiation indicating train 331 may be leaving platform 325. In addition, processing component 110 may determine train 331 may be exiting segments 210 and 215 as indicated by a decrease in thermal radiation for pixel values within segments 210 and 215. In addition, a direction of travel may be ascertained by analyzing the progression of determined changes among time sequenced image frames along segments 210 and 215.

Plot 400 includes a plurality of extracted subsets of pixels showing a post-departure period 450. Post-departure period 450 corresponds to target scene 170 of FIG. 3E. Processing component 110 may compare the extracted subsets of pixel values from the plurality of images of post-departure period 450 and determined changes correspond to a scene without an object detected on trajectory 205. In this regard, train 331 may have moved from platform 325 and may have moved out of target scene 170. A thermal radiation value of pixels of post-departure period 450 may be a lower value than train 331 in target scene 170 and substantially equivalent to pixel values of pre-arrival period 410.

Processing component 110 may be configured to detect a speed of an object using the determined changes. In this regard, processing component 110 may approximate the speed by approximating a change in position on the position axis among two successive image frames whose successive pixel values shifted in magnitude and dividing the approximate change in position by the time interval between the successive image frames. An entering rate of speed may be determined for train 331 by analyzing contour 421. Similarly, an exiting rate of speed for train 331 may be determined by analyzing contour 441. For example, a contour with a slight curve, such as contour 421, may indicate train 331 is moving into target scene 170 at a slow rate of speed. A contour with a more exaggerated curve, such as contour 521 of FIG. 5, may indicate train 331 is moving into target scene 170 at a fast rate of speed.

FIG. 5 illustrates a plot 500 of a plurality of extracted subsets of pixels corresponding to trajectory 205 of target scene 170 where train 331 enters and exits target scene 170 without stopping at platform 325. Periods on plot 500 generally correspond to scenes of FIGS. 3A through 3E with the exception train 331 does not stop at platform 325 in FIG. 5. For example, image frames of extracted pixels of trajectory 205 in pre-arrival period 510 on plot 500 corresponds to FIG. 3A where train 331 has not entered target scene 170. Image frames of extracted pixels of trajectory 205 in train approaching platform period 520 corresponds to FIG. 3B where train 331 is approaching train platform 325 along trajectory 205. Image frames of extracted pixels of trajectory 205 in train moving through platform period 530 corresponds to FIG. 3C when train 331 is moving along trajectory 205. Image frames of extracted pixels of trajectory 205 in train leaving platform period 540 corresponds to FIG. 3D where train 331 is leaving platform 325 along trajectory 205. Image frames of trajectory 205 in post-departure period 550 corresponds to FIG. 3E where a single person is standing on platform 325 after train 331 moved out of target scene 170.

Pre-arrival period 510 and train approaching platform period 520 of plot 500 are similar to pre-arrival period 410 and train approaching platform period 420 of plot 400 of FIG. 4. Pre-arrival period 510 may show constant pixel values in extracted subsets of pixels from image frame to image frame corresponding to a scene without an object detected on trajectory 205 and substantially equivalent to pixel values of pre-arrival period 410. Processing component 110 may compare the extracted subsets of pixel values from the plurality of images of train approaching platform period 520 and determined changes in pixel values correspond to an increase in thermal radiation indicating train 331 is entering target scene 170 and approaching platform 325. In addition, processing component 110 may determine train 331 may be within segment 210 as indicated by an increase in thermal radiation among the extracted subsets of pixel values within segment 210.

Plot 500 includes a plurality of extracted subsets of pixels of images showing a train moving through platform period 530. Processing component 110 may compare the extracted subsets of pixel values from the plurality of images of train moving through platform period 530 and determined changes correspond to an increased thermal radiation indicating train 331 may be moving through platform 325. Further, train moving through platform period 530 includes few image frames indicating the overall short duration train 331 is in the train moving through platform period 530 period of plot 500.

Processing the extracted subsets of pixels of train leaving platform period 540 and post-departure period 550 are similar to processing the extracted subsets of pixels for train leaving platform period 440 and post-departure period 450 of FIG. 4. Image frames of FIG. 5 illustrate train 331 moves from segment 210 to segment 215 and exits target scene 170 providing for a direction of travel. Further, entering rate of speed 521 may be determined for train 331 by analyzing contour 521 and exiting rate of speed 541 may be determined by analyzing contour 541 in a manner as described herein.

Figure 6:
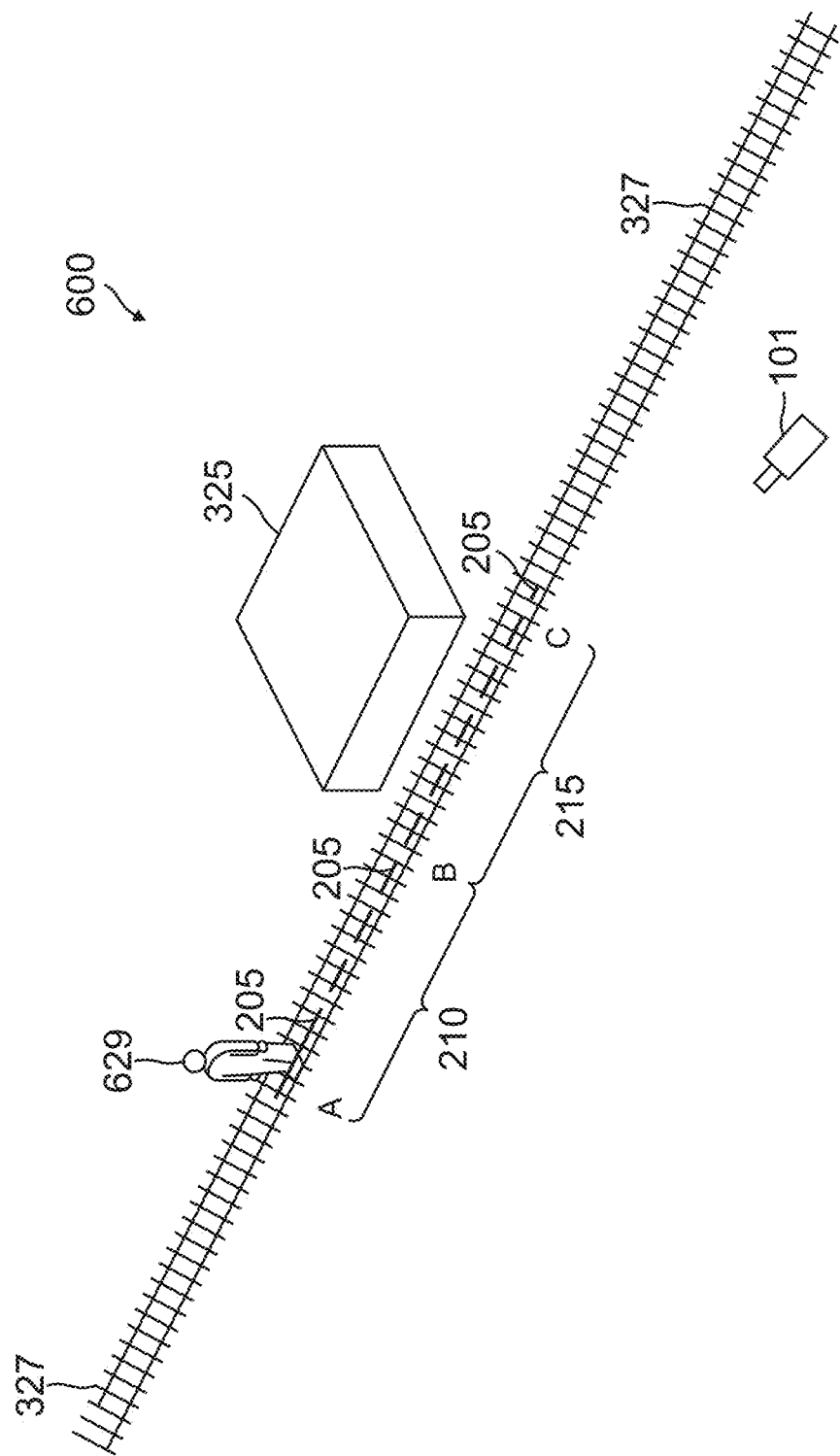
FIG. 6 illustrates a target scene and an object substantially still in a pre-defined trajectory in accordance with an embodiment of the disclosure.

FIG. 6 illustrates a scene 600 of the target scene 170 and an object substantially still in a pre-defined trajectory 205 in accordance with an embodiment of the disclosure. FIG. 6 shows a human 629 standing on rail tracks 327. Camera 101 may capture images of target scene 170 with human 629 standing on rail tracks 327. In this regard, trajectory 205 may include segment 210 with human 329 standing on tracks 327 and segment 215 with no object.

Figure 7:
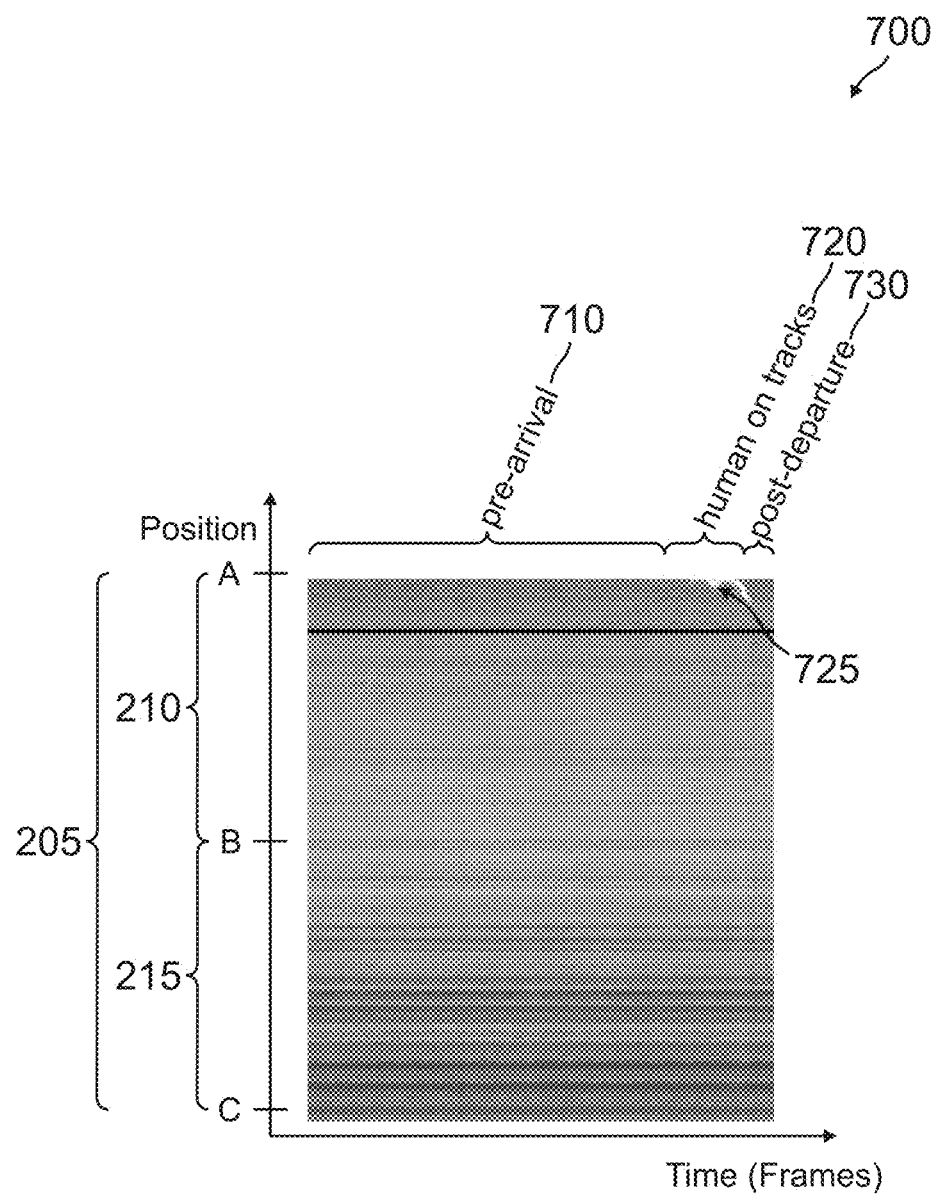
FIG. 7 illustrates a plot of a plurality of extracted subsets of pixels corresponding to the trajectory of the target scene of FIG. 6 in accordance with an embodiment of the disclosure.

FIG. 7 illustrates a plot 700 of a plurality of extracted subsets of pixels corresponding to the trajectory 205 of the target scene 170 of FIG. 6 in accordance with an embodiment of the disclosure. Plot 700 may include a position axis and a time (frames) axis similar to plot 400, as described herein. Plot 700 includes a plurality of extracted subsets of pixels showing a pre-arrival period 710, a human on tracks period 720, and a post-departure period 730. Pre-arrival period 710 corresponds to target scene 170 of FIG. 3A. Processing component 110 may compare the extracted subsets of pixel values from the plurality of images of pre-arrival period 710 and determined changes correspond to a scene without an object detected on trajectory 205.

Plot 700 includes a plurality of extracted subsets of pixels of images showing a human on tracks period 720. Human on tracks period 720 corresponds to target scene 170 of FIG. 6. Processing component 110 may compare the extracted subsets of pixel values from the plurality of images of human on tracks period 720 and determined changes correspond to an increase in thermal radiation within a subset of segment 210 indicating a detected object 725. Processing component 110 may determine detected object 725 is not a vehicle due to the reduced number of determined changed pixel values. Furthermore, processing component may determine detected object 725 is moving along trajectory 205 within target scene 170. Detected object 725 may move along trajectory 205 for a period of time and later move out of trajectory 205, as shown in FIG. 7. In this regard, human on tracks period 720 may be detected as an additional object, where the additional object may include a human or an animal.

Processor of processing component 110 may be configured to perform a video analytics on a portion of the images greater than the subset to detect the additional detected object 725 (e.g., human on tracks period 720) in target scene 170 which may be smaller in size than a detected first object (e.g., detected first object 331). For example, a first object (e.g., a train, a tram, a bus, a car, or any vehicle moving along trajectory 205) may produce a significant number or portion of the extracted subset of pixels to exhibit changing intensities.

Video analytics may be used to detect an additional object after a first object is detected using the present invention. Processing component may provide a location and a direction of travel information of the detected first object to assist in performing the video analytics. Processing component 110 may be adapted to interface with alert component 162 via a wired or wireless communication component 152 to generate an alert in response to the detection of the additional object. An alert may include an audible signal (e.g., audible alarm), a visible signal (e.g., flashing light), and/or an electronic message (e.g., electronic message received by a smart phone, a tablet, a personal digital assistant (e.g., a wireless, mobile device), a laptop computer, a desktop computer, or other type of device) in response to an input received from processing component 110.

FIGS. 8A-8E illustrate a target scene 170 and an object moving in multiple directions through a pre-defined trajectory 805 within the target scene 170 at various times in accordance with embodiments of the disclosure. These illustrated embodiments show a car 831 moving into and out of a target scene 170 (e.g., a parking lot 870) on a trajectory 805. As shown, FIGS. 8A-8E illustrate various example scenes (e.g., scenes 800, 801, 802, 803, and 804) of corresponding target scene 170 as captured by camera 101. Camera 101 may be arranged in a fixed orientation to capture images of target scene 170 including trajectories 805, 806, 807 and 808 of parking lot 870 at various times as illustrated by example scenes 800 through 804. Trajectory 805 is a path (e.g., from position A to position B in FIGS. 8A through 8E) extending past either end of parking space 860. Example scenes show a car 831 entering target scene 170, parking in space 860, and exiting target scene 170.

Imaging system 100 provides a capability, in substantially real time, to detect an object (e.g., such as car 831 of FIGS. 8B through 8D) in target scene 170. For example, imaging system 100 may be configured to capture two or more images of target scene 170 using camera 101 (e.g., a thermal imaging and/or a visible light camera). Processing component 110 may extract from each of the captured images, a subset of pixel values of target scene 170 corresponding to trajectory 805. Processing component 110 may process the extracted pixel values to detect an object (e.g., car 831) in target scene 170 by comparing and determining changes among the subsets of pixel values.

Figure 8A:
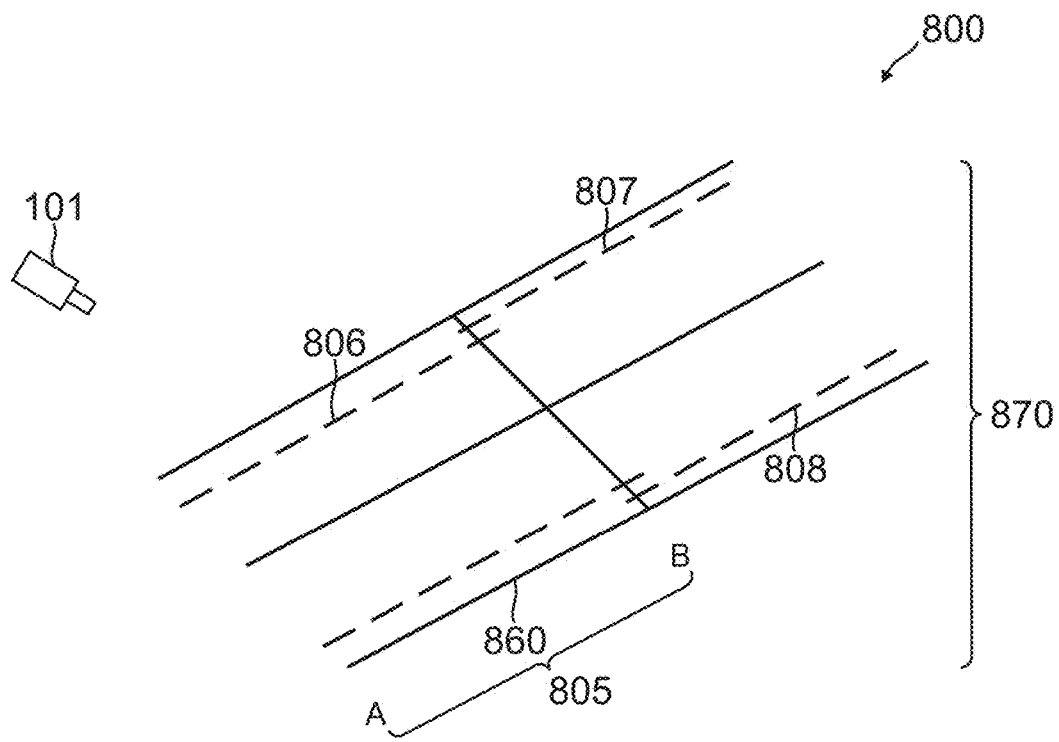
FIGS. 8A-8E illustrate a target scene and an object moving in multiple directions through a pre-defined trajectory within the target scene at various times in accordance with embodiments of the disclosure.

FIG. 8A illustrates a scene 800 of target scene 170 (e.g., a parking lot 870). As shown, scene 800 is substantially stationary without an object along on trajectory 805, corresponding to a pre-arrival of car 831.

Figure 8B:
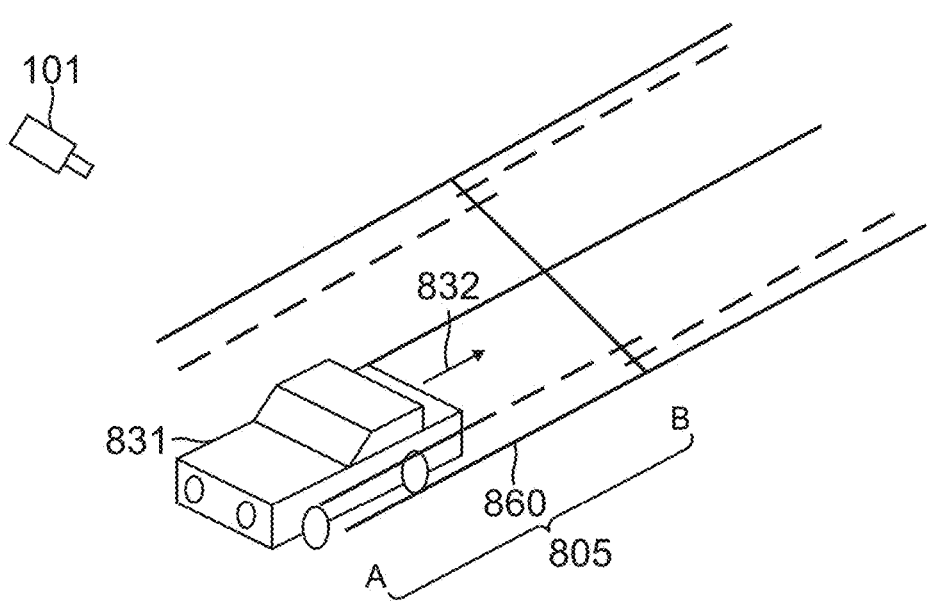

FIG. 8B illustrates a scene 801 of target scene 170 with car 831 moving in a direction 832 entering parking space 860. Captured images of scene 801 may show trajectory 805 with car 831 moving from position A to position B on trajectory 805.

Figure 8C:
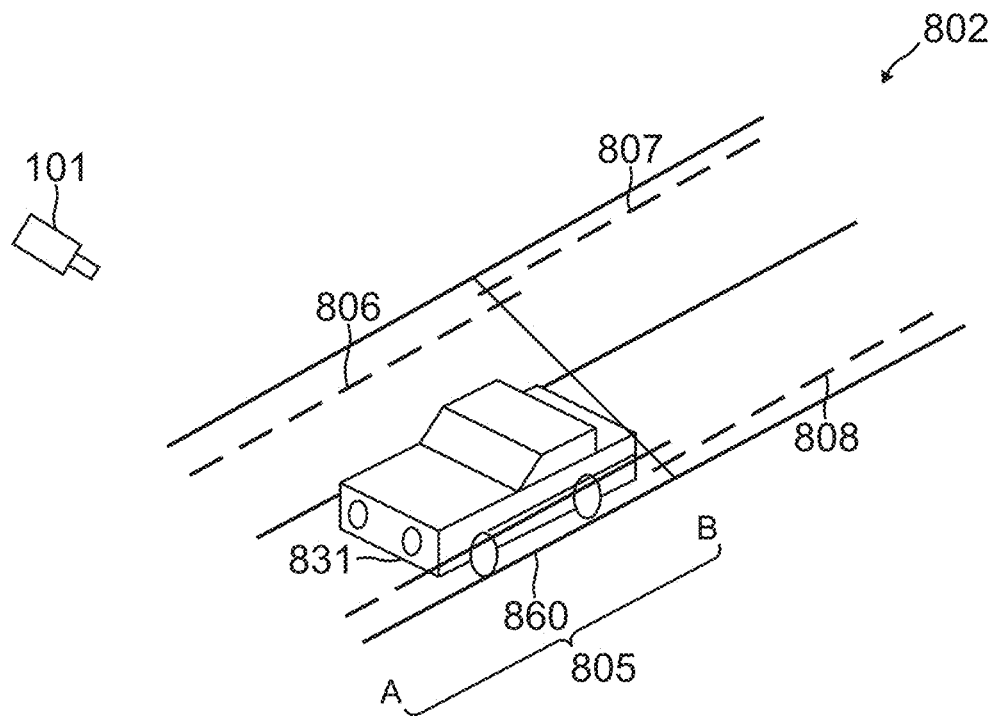

FIG. 8C illustrates a scene 802 of target scene 170 with car 831 parked in parking space 860. Captured images of scene 802 may show trajectory 805 with car 831 motionless.

Figure 8D:
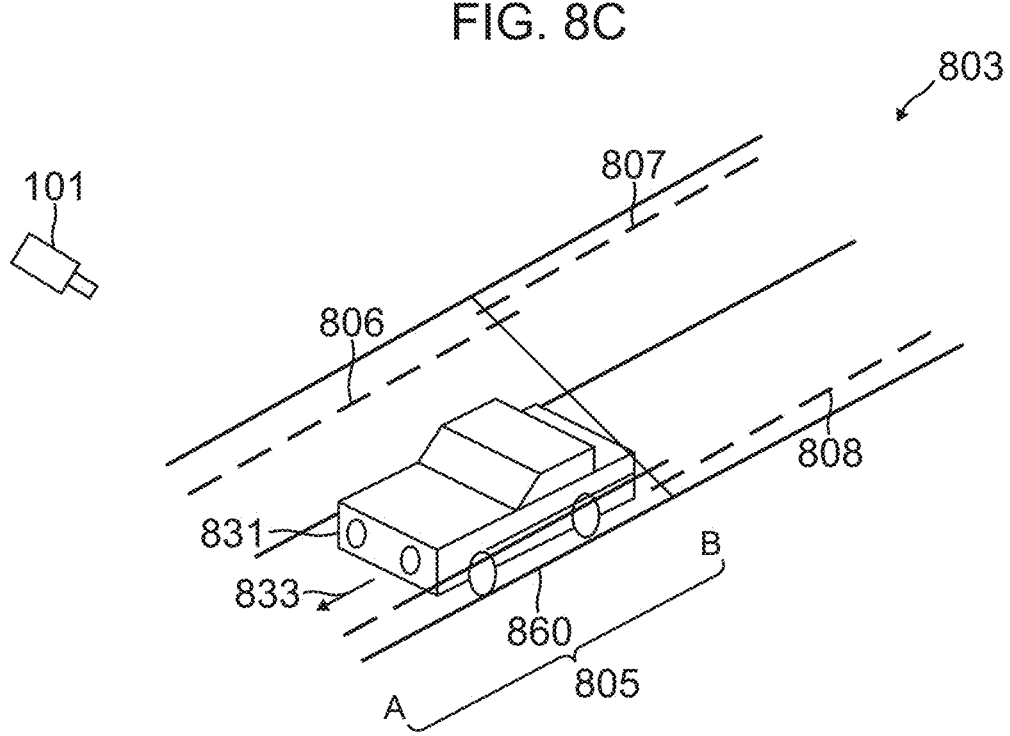

FIG. 8D illustrates a scene 803 of target scene 170 with car 831 moving in a direction 833 exiting parking space 860. Captured images of scene 803 may show trajectory 805 with car 831 moving from position B to position A on trajectory 805.

Figure 8E:
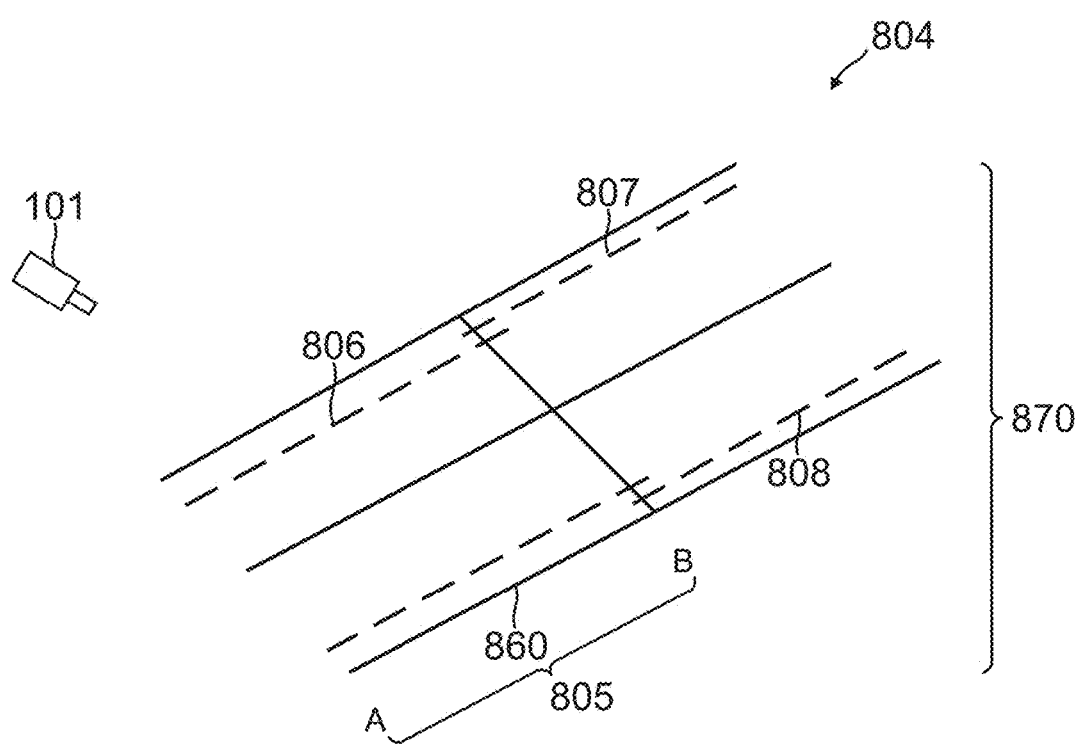

FIG. 8E illustrates a scene 804 of target scene 170 after car 831 exited parking lot 870. As shown, scene 804 is substantially stationary without an object along on trajectory 805, corresponding to a post-departure of car 831.

Figure 9:
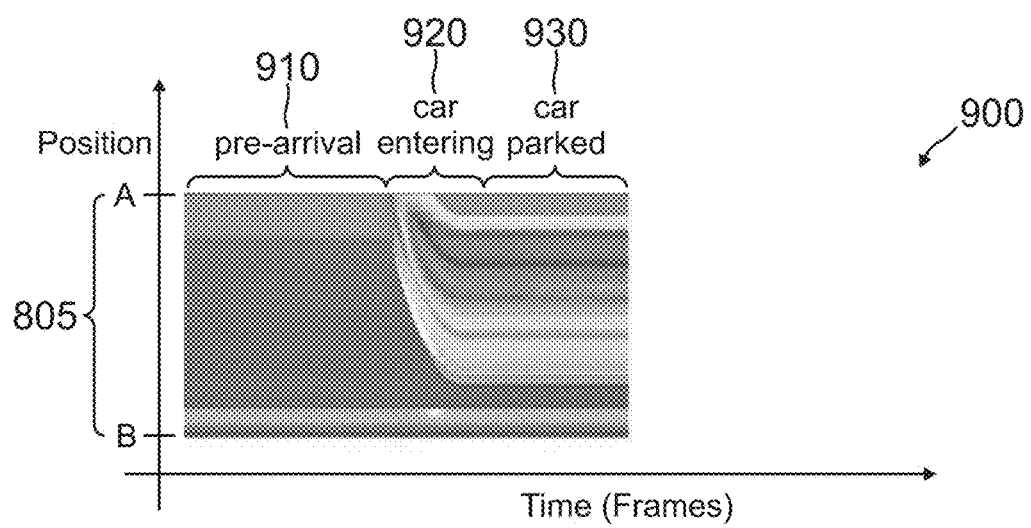
FIGS. 9 and 10 illustrate plots of a plurality of extracted subsets of pixels corresponding to the trajectory of the target scene of FIGS. 8A-8E in accordance with embodiments of the disclosure.
Figure 10:
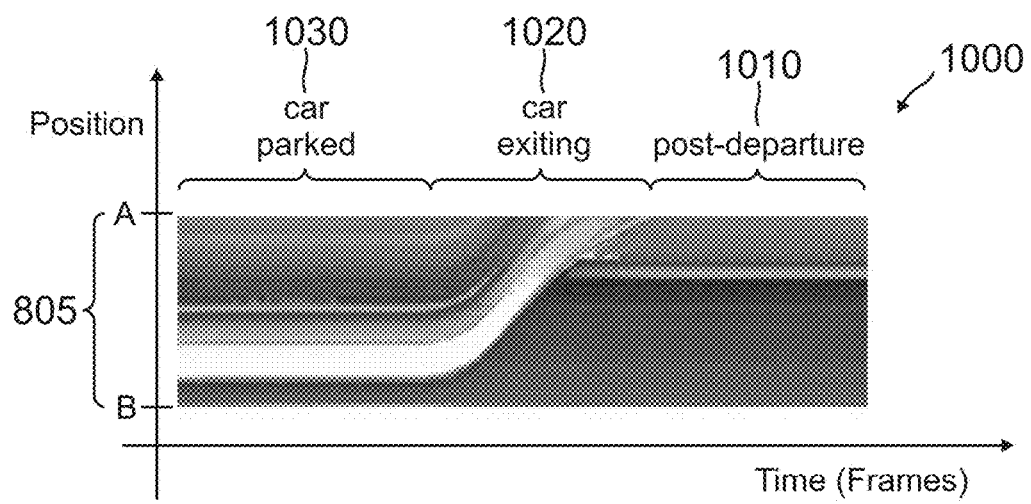

FIGS. 9 and 10 illustrate plots of a plurality of extracted subsets of pixels corresponding to the trajectory 805 of the target scene 170 of FIGS. 8A-8E in accordance with embodiments of the disclosure. FIG. 9 shows a plot 900 of a plurality of extracted subsets of pixels corresponding to trajectory 805 of target scene 170. Periods on plot 900 correspond to scenes of FIGS. 8A through 8C. For example, image frames of extracted pixels of trajectory 805 in pre-arrival period 910 on plot 900 corresponds to FIG. 8A where car 831 has not entered target scene 170. Image frames of extracted pixels of trajectory 805 in car 831 entering period 920 corresponds to FIG. 8B where car 831 is entering parking space 860 along trajectory 805. Image frames of extracted pixels of trajectory 805 in car 831 parked period 930 corresponds to FIG. 8C where car 831 is parked in parking space 860 along trajectory 805.

Plot 900 includes a plurality of extracted subsets of pixels showing a pre-arrival period 910. Pre-arrival period 910 corresponds to target scene 170 of FIG. 8A. Processing component 110 may compare the extracted subsets of pixel values from the plurality of images of pre-arrival period 910 and determined changes may correspond to a scene without an object detected on trajectory 805. In this regard, pre-arrival period 910 shows constant pixel values of extracted subsets of pixels along trajectory 805 from image frame to image frame corresponding to an empty parking space 860.

Plot 900 includes a plurality of extracted subsets of pixels showing a car 831 entering period 920 into parking space 860. Car 831 entering period 920 corresponds to target scene 170 of FIG. 8B. Processing component 110 may compare the extracted subsets of pixel values from the plurality of images of car 831 entering period 920. Determined changes may correspond to an increase in thermal radiation of pixel values from position A to position B along trajectory 805 as car 831 enters parking space 860.

Plot 900 includes a plurality of extracted subsets of pixels showing a car 831 parked period 930 in parking space 860. Car 831 parked period 930 corresponds to target scene 170 of FIG. 8C. Processing component 110 may compare the extracted subsets of pixel values from the plurality of images of car 831 parked period 930 and determined changes may correspond to no change in thermal radiation indicating car 831 may be parked in parking space 860. In this regard, constant pixel values of increased thermal radiation from image frame to image frame which is substantially similar to car 831 may correspond to car 831 parked in parking space 860.

FIG. 10 shows a plot 1000 of a plurality of extracted subsets of pixels corresponding to trajectory 805 of target scene 170. Periods on plot 1000 correspond to scenes of FIGS. 8C through 8E. For example, image frames of extracted pixels of trajectory 805 in car 831 parked period 1030 on plot 1000 corresponds to FIG. 8C where car 831 is parked in parking space 860. Image frames of extracted pixels of trajectory 805 in car 831 exiting period 1020 correspond to FIG. 8D where car 831 is exiting parking space 860 along trajectory 805. Image frames of extracted pixels of trajectory 805 in post-departure period 1010 corresponds to FIG. 8E where car 831 has moved out of target scene 170.

Plot 1000 includes a plurality of extracted subsets of pixels of trajectory 805 showing a car 831 parked period 1030 in parking space 860. Car 831 parked period 1030 corresponds to target scene 170 of FIG. 8C. Processing component 110 may compare the extracted subsets of pixel values from the plurality of images of car 831 parked period 1030 and determined changes may correspond to no change in thermal radiation indicating car 831 may be parked in parking space 860 similar to car 831 parked period 930 where constant pixel values of extracted subsets of pixels display an increased thermal radiation from image frame to image frame corresponding to car 831.

Plot 1000 includes a plurality of extracted subsets of pixels of trajectory 805 showing a car 831 exiting period 1020 from parking space 860. Car 831 exiting period 1020 corresponds to target scene 170 of FIG. 8D. Processing component 110 may compare the extracted subsets of pixel values from the plurality of images of car 831 exiting period 1020 and determine changes may show a decrease in thermal radiation of pixel values from position B to position A along trajectory 805 as car 831 exits parking space 860.

Plot 1000 includes a plurality of extracted subsets of pixels corresponding to trajectory 805 showing a post-departure period 1010. Post-departure period 1010 corresponds to target scene 170 of FIG. 8E. Processing component 110 may compare the extracted subsets of pixel values from the plurality of images of post-departure period 1010 and determine changes may show constant pixel values from image frame to image frame corresponding to an empty parking space 860 similar to pre-arrival period 910 of FIG. 9.

Figure 11:
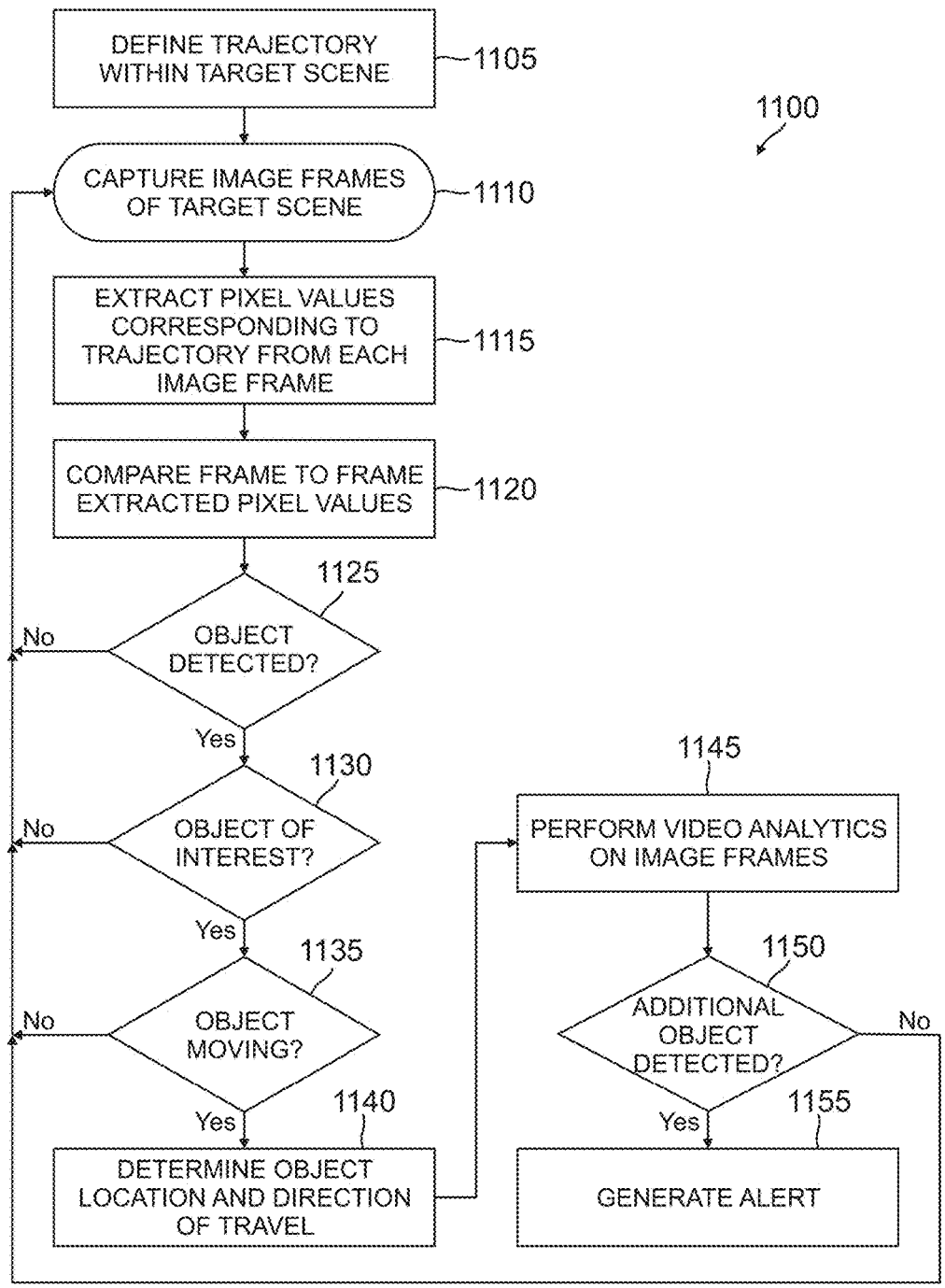
FIG. 11 illustrates a process of detecting an object within a target scene and generating an alert in accordance with an embodiment of the disclosure.

FIG. 11 illustrates a process of detecting an object within a target scene 170 and generating an alert in accordance with an embodiment of the disclosure.

In block 1105, processing component 110 may be configured to define a trajectory between two locations within target scene 170. For example, as shown in FIGS. 3A through 3E, trajectory 205 is a path extending past either end of platform 325 along a set of rail tracks 327. Furthermore, as shown in FIGS. 8A through 8E, trajectory 805 is a path extending from position A to position B within parking space 860.

In block 1110, image capture component 130 of camera 101 may capture two or more images of target scene 170 which are provided to processing component 110. Target scene 170 may be included in a fixed field of view of camera 101.

In block 1115, processing component 110 may extract, from each of the captured image frames, a subset of pixel values corresponding to the trajectory.

In block 1120, processing component 110 may compare the extracted subsets of pixel values from the two or more images of the target scene and determine changes in the subsets of pixel values among the two or more images.

In block 1125, processing component 110 may detect an object on the trajectory in target scene 170 using the determined changes. For example, processing component 110 may detect an object in response to the determined changes corresponding to an increase or a decrease in thermal radiation. In this regard, train 331 of FIGS. 3B-3D may be detected at extracted subsets of pixel values 420, 430, and 440 in plot 400 of FIG. 4. Human 629 of FIG. 6 may be detected at extracted subsets of pixel values 720 in plot 700 of FIG. 7. Car 831 of FIGS. 8B-8D may be detected at extracted subsets of pixel values 920 and 930 in plot 900 of FIG. 9 and extracted subsets of pixel values 1020 and 1030 in plot 1000 of FIG. 10. If an object is not detected, then the process of FIG. 11 may return to block 1110 where two or more additional images of target scene 170 may be captured and processed by processing component 110 to determine if an object may be detected along the trajectory of target scene 170. If an object is detected, the process of FIG. 11 moves to block 1130.

In block 1130, processing component 110 may determine if the object detected is an object of interest. In this regard, an object of interest may be detected by processing component 110 responding to a significant number of extracted subset of pixels (e.g., along the trajectory) changing intensity (e.g., an increase and/or a decrease in thermal radiation) when successive captured image frames are compared. An object of interest may be a first object including a vehicle (e.g., a train, a tram, a bus, a car, or any vehicle) moving along the trajectory. If an object of interest is not detected, then the process of FIG. 11 may return to block 1110 where two or more additional images of target scene 170 may be captured and processed by processing component 110. An additional object (e.g., a human or an animal) may be detected, identified, and provided to a video analytics for further detection processing. If an object of interest is detected, the process of FIG. 11 moves to block 1135.

In block 1135, processing component 110 may detect whether the object of interest is moving in the trajectory in response to the determined changes corresponding to an increase or a decrease in thermal radiation. For example, plot 400 of FIG. 4 shows an increase in thermal radiation from successive captured image frames of extracted subsets of pixel values corresponding to train approaching platform period 420. Conversely, plot 400 of FIG. 4 shows a decrease in thermal radiation from successive captured image frames of extracted subsets of pixel values corresponding to train leaving platform period 440. Further, a constant increased thermal radiation from successive captured image frames of extracted subsets of pixel values may show a detected object stopped within target scene 170, corresponding to train stopped at platform period 430 of FIG. 4. In this regard, train 331 may be detected moving and stopped along the trajectory within target scene 170.

In another embodiment, car 831 may be shown entering and exiting a parking space in plot 900 of FIG. 9 and plot 1000 of FIG. 10. Plot 900 of FIG. 9 shows an increase in thermal radiation from successive captured image frames of extracted subsets of pixel values corresponding to car 831 entering period 920. Plot 1000 of FIG. 10 shows a decrease in thermal radiation from successive captured image frames of extracted subsets of pixel values corresponding to car 831 exiting period 1020.

If an object of interest is not moving, then the process of FIG. 11 may return to block 1110 where two or more additional images of target scene 170 may be captured and processed by processing component 110. If an object of interest is moving, the process of FIG. 11 moves to block 1140.

In block 1140, processing component 110 may determine a location and a direction of travel of the detected object. In this regard, the trajectory may include a plurality of segments of extracted subsets of pixel values and processing component 110 may perform processing within each of the segments to detect the object in each of the segments. Processor loading may be reduced by segmenting the trajectory as fewer pixels may need to be processed for each segment, providing for a faster detection. Further, a more accurate location along the trajectory may result from segmenting as the object may be detected and reported within one or more segments along the trajectory. Direction of travel may be determined by comparison of segments in real time. Further, a speed of the object may be detected using the determined changes, as described herein.

In block 1145, processing component 110 may perform a video analytics on the image frames after detecting a moving first object (e.g., a train, a car, or any vehicle moving along the trajectory). In this regard, a video analytics may be performed on a portion of the images greater than the subset to detect an additional object in the target scene 170 within the trajectory.

In block 1150, processing component 110 may determine if an additional object is detected. In this regard, processing component 110 may analyze the video analytics to determine if an additional object may be on the trajectory within target scene 170. Processing component 110 may compare the location and direction of travel information of the detected first object of block 1140 to the location of additional object detected of block 1145 to determine if a user or other authority should be notified in regards to the additional object. Notification may be initiated if the additional object is on and/or substantially nearby the trajectory. Notification may be provided to a user and/or other authority in the form of an alarm (e.g., audible and/or visible) and/or an electronic message received by a smart phone or other type of device used for electronic communication. If an additional object is not detected, then the process of FIG. 11 may return to block 1110 where two or more additional images of target scene 170 may be captured and processed by processing component 110. If an additional object is detected, the process of FIG. 11 moves to block 1155.

In block 1155, processing component 110 may respond to a detected additional object on the trajectory within target scene 170 by generating an alert. Alert may notify a user or persons within the target scene 170 a first object may be moving along trajectory within target scene 170. In one embodiment, an audible signal (e.g., audible alarm) may provide notification to a user and/or persons within range of the audible signal. In another embodiment, a visible signal (e.g., flashing light) may provide notification to a user and/or persons within sight of the visible signal. An electronic message (e.g., electronic message received by a smart phone, a tablet, a personal digital assistant (e.g., a wireless, mobile device), a laptop computer, a desktop computer, or other type of device) may be communicated to a user or a responsible authority within target scene 170 in response to a message provided by processing component 110.

In view of the present disclosure, it will be appreciated that detecting an object of interest within the field of view of an imaging device implemented in accordance with various embodiments set forth herein may provide for substantially real time processing of a target scene while at the same time reducing false positives of the detected object. In this regard, a fixed image of a target scene may be captured at various times. A subset of pixels corresponding to a pre-defined trajectory may be extracted from two or more image frames of the target scene. Extracting a subset of pixels reduces the quantity of data to process and thereby provides for substantially real time processing. Captured image frames may be compared to determine if an object of interest is present along the trajectory. Comparing successive captured image frames negates the need for a background image and reduces the likelihood of false positives.

Furthermore, after an object of interest is detected, a video analytics process may be performed on portions of the captured images greater than the trajectory subset of pixels to detect an additional object in the target scene. An alert may be initiated and provided to a user and/or other authority after an additional object is detected.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as program code and/or data, can be stored on one or more computer readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

What claimed is:

1. A method comprising:
   defining a fixed trajectory comprising a path between two locations within a target scene;
   receiving a plurality of images of the target scene successively captured in time;
   extracting, from each of the images, a subset of pixels with pixel values corresponding to the fixed trajectory;
   comparing the extracted subsets of pixel values from the plurality of images of the target scene;
   determining changes in the subsets of pixel values among the plurality of images; and
   detecting an object entering the target scene substantially along the fixed trajectory in response to the determined changes.

2. The method of claim 1, further comprising capturing the plurality of images from the target scene by an imaging device, wherein the imaging device comprises a thermal camera and/or a visible light camera.

3. The method of claim 1, wherein:
   the images are thermal images;
   the detecting the object entering the target scene is performed in response to the determined changes based on an increase in thermal radiation along the fixed trajectory; and
   the method further comprises detecting the object exiting the target scene in response to the determined changes based on a decrease in thermal radiation along the fixed trajectory.

4. The method of claim 1, wherein the method further comprises detecting a speed of the object using the determined changes.

5. The method of claim 1, wherein:
   the fixed trajectory comprises a plurality of segments; and
   the comparing, the determining, and the detecting is performed for each of the segments to detect the object in each of the segments.

6. The method of claim 1, wherein the detected object is a first object, the method further comprising performing a video analytics process on a portion of the images greater than the subset of pixel values to detect a second object in the target scene within the fixed trajectory.

7. The method of claim 6, further comprising generating an alert in response to the detection of the second object.

8. The method of claim 6, wherein the first object is a vehicle and the second object is a human or an animal.

9. A system comprising:
   a memory component configured to store a plurality of images of a target scene successively captured in time; and
   a processor configured to:
      define a fixed trajectory comprising a path between two locations within the target scene,
      extract, from each of the images, a subset of pixels with pixel values corresponding to the fixed trajectory,
      compare the extracted subsets of pixel values from the plurality of images of the target scene,
      determine changes in the subsets of pixel values among the plurality of images, and
      detect an object entering the target scene substantially along the fixed trajectory in response to the determined changes.

10. The system of claim 9, further comprising an imaging device configured to capture the plurality of images of the target scene, wherein the imaging device comprises a thermal camera and/or a visible light camera.

11. The system of claim 9, wherein the images are thermal images;
    the detection of the object entering the target scene is performed in response to the determined changes based on an increase in thermal radiation along the fixed trajectory; and
    the processor is configured to detect the object exiting the target scene in response to the determined changes based on a decrease in thermal radiation along the fixed trajectory.

12. The system of claim 9, wherein the processor is configured to detect a speed of the object using the determined changes.

13. The system of claim 9, wherein:
    the fixed trajectory comprises a plurality of segments; and
    the processor is configured to perform processing for each of the segments to detect the object in each of the segments.

14. The system of claim 9, wherein:
    the detected object is a first object; and
    the processor is configured to perform a video analytics process on a portion of the images greater than the subset of pixel values to detect a second object in the target scene within the fixed trajectory.

15. The system of claim 14, wherein the processor is configured to generate an alert in response to the detection of the second object.

16. The system of claim 14, wherein the first object is a vehicle and the second object is a human or an animal.

17. The system of claim 14, wherein the processor is configured by a plurality of instructions stored in the memory.

18. A non-transitory machine-readable medium comprising executable instructions which, when executed by a processor, cause the processor to perform a method comprising:
    defining a fixed trajectory comprising a path between two locations within a target scene;
    receiving a plurality of images of the target scene successively captured in time;
    extracting, from each of the images, a subset of pixels with pixel values corresponding to the fixed trajectory;
    comparing the extracted subsets of pixel values from the plurality of images of the target scene;
    determining changes in the subsets of pixel values among the plurality of images; and
    detecting an object entering the target scene substantially along the fixed trajectory in response to the determined changes.

* * * * *